United States Patent
Mori et al.

(10) Patent No.: US 7,801,822 B2
(45) Date of Patent: Sep. 21, 2010

(54) METHOD OF CONTROLLING STORAGE SYSTEM

(75) Inventors: Hajime Mori, Yokohama (JP);
Nobuhiro Maki, Yokohama (JP);
Yukinori Sakashita, Sagamihara (JP);
Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 950 days.

(21) Appl. No.: 11/216,169

(22) Filed: Sep. 1, 2005

(65) Prior Publication Data
US 2006/0287961 A1 Dec. 21, 2006

(30) Foreign Application Priority Data
Jun. 17, 2005 (JP) ............................. 2005-178117

(51) Int. Cl.
*G06F 21/00* (2006.01)
(52) U.S. Cl. ............................. 705/59; 705/51; 726/31
(58) Field of Classification Search ................. 709/223; 705/59
See application file for complete search history.

(56) References Cited

U.S. PATENT DOCUMENTS 7,035,918 B1 * 4/2006 Redding et al. ............. 709/223

| 2001/0013024 A1 * | 8/2001 | Takahashi et al. ............. 705/59 |
| 2004/0153416 A1 | 8/2004 | Fujimoto et al. |
| 2004/0172367 A1 * | 9/2004 | Chavez ........................ 705/59 |
| 2004/0260875 A1 | 12/2004 | Murotani et al. |
| 2005/0268344 A1 * | 12/2005 | Matsukawa et al. ........... 726/27 |

FOREIGN PATENT DOCUMENTS

JP 2001-337790 12/2001
JP 2004-234559 8/2004

* cited by examiner

*Primary Examiner*—Andrew J. Fischer
*Assistant Examiner*—Chrystina Zelaskiewicz
(74) *Attorney, Agent, or Firm*—Brundidge & Stanger, P.C.

(57) ABSTRACT

Provided is a computer system including: a plurality of storage systems interconnected via a network, each storage system including a logical volume that stores data; and a management computer that is connected to the storage systems via the network and includes a port connected to the network and a processor connected to the port, wherein: a logical volume of a transfer source in a storage system of the data transfer source and a logical volume of a transfer destination in a storage system of the data transfer destination are decided; it is determined whether it is necessary or not to migrate a license of a program used for the logical volume of the transfer source from one of the plurality of storage systems to the storage system of the transfer destination; and when it is determined necessary to migrate the license, license information regarding the license to the storage system of the transfer destination is migrated. Accordingly, costs of purchasing licenses necessary during data migration or the like are reduced.

4 Claims, 31 Drawing Sheets

LICENSE TABLE

| LICENSE KEY | PROGRAM NAME | APPLIED VOLUME ID | MAXIMUM CAPACITY | USED CAPACITY |
|---|---|---|---|---|
| XXXXA | PP1 | VOL1, VOL2 | 15TB | 15TB |
| XXXXB | PP1 | UNUSED | 10TB | 0TB |

*FIG.4*

CONFIGURATION MANAGEMENT TABLE

| STORAGE SYSTEM NAME | MODEL | LOGICAL VOLUME ID | LOGICAL VOLUME SIZE | USED PROGRAM NAME | PATH |
|---|---|---|---|---|---|
| STORAGE SYSTEM 101 | A | VOL1 | 10TB | PP1, PP2 | 102, 103 |
| STORAGE SYSTEM 101 | A | VOL2 | 5TB | PP1, PP2 | 102, 103 |
| STORAGE SYSTEM 102 | A | VOL3 | 5TB | NONE | 101, 103 |
| STORAGE SYSTEM 103 | B | VOL4 | 10TB | NONE | 101, 102 |

FIG.5

MIGRATION MANAGEMENT TABLE

| MIGRATION SOURCE || MIGRATION DESTINATION ||
|---|---|---|---|
| STORAGE SYSTEM NAME | LOGICAL VOLUME ID | STORAGE SYSTEM NAME | LOGICAL VOLUME ID |
| STORAGE SYSTEM 101 | VOL2 | STORAGE SYSTEM 102 | VOL3 |

*FIG.6*

LICENSE TYPE TABLE

| PROGRAM NAME | LICENSE UNIT | RATE STRUCTURE |
|---|---|---|
| PP1 | STORAGE SYSTEM | FLAT CAPACITY RATE (FOR EACH 1 TB) |
| PP2 | COMPUTER SYSTEM (DIVISIBLE) | FLAT CAPACITY RATE (FOR EACH 1 TB) |

FIG.7

USED LICENSE TABLE

| LICENSE KEY | PROGRAM NAME | APPLIED STORAGE SYSTEM NAME | APPLIED VOLUME ID | MAXIMUM CAPACITY | USED CAPACITY |
|---|---|---|---|---|---|
| XXXXA | PP1 | STORAGE SYSTEM 101 | VOL1, VOL2 | 15TB | 15TB |
| XXXXB | PP1 | STORAGE SYSTEM 101 | UNUSED | 10TB | 0TB |
| XXXXC | PP2 | STORAGE SYSTEM 101 | VOL1, VOL2 | 20TB | 15TB |

FIG.8

LICENSE MIGRATION MANAGEMENT TABLE

| MIGRATION PROGRAM NAME | MIGRATION CAPACITY | MIGRATION SOURCE | MIGRATION DESTINATION |
|---|---|---|---|
| PP1 | 5TB | STORAGE SYSTEM 101 | STORAGE SYSTEM 102 |
| PP2 | 5TB | STORAGE SYSTEM 101 | STORAGE SYSTEM 102 |

FIG.9

COPY PAIR MANAGEMENT TABLE

| COPY SOURCE | | | COPY DESTINATION | | |
|---|---|---|---|---|---|
| STORAGE SYSTEM NAME | LOGICAL VOLUME ID | | STORAGE SYSTEM NAME | LOGICAL VOLUME ID | |
| STORAGE SYSTEM 101 | VOL2 | | STORAGE SYSTEM 102 | VOL3 | |

EXTERNAL VOLUME MAPPING TABLE

| EXTERNALLY CONNECTED STORAGE SYSTEM (TRANSFER SOURCE) | | STORAGE SYSTEM EQUIPPED WITH EXTERNAL CONNECTION FUNCTION (TRANSFER DESTINATION) | |
|---|---|---|---|
| STORAGE SYSTEM NAME | LOGICAL VOLUME ID (EXTERNAL VOLUME) | STORAGE SYSTEM NAME | VIRTUAL VOLUME ID |
| STORAGE SYSTEM 2502 | VOL2 | STORAGE SYSTEM 2501 | VOL3 |

FIG.29

METHOD OF CONTROLLING STORAGE SYSTEM

CROSS-REFERENCE TO PRIOR APPLICATION

This application relates to and claims priority from Japanese Patent Application No. 2005-178117 filed on Jun. 17, 2005 the entire disclosure of which is incorporated herein by reference.

BACKGROUND

This invention relates to a license management for a program installed in a storage system.

In a computer system that includes one or more storage systems, a program on a storage system base (referred to as storage system program hereinafter) is installed in each storage system. Such a storage system program is a program that executes, for example, creation/deletion of a logical volume, migration/relocation of data, control of host access to the logical volume, or, remote or local copying.

A license structure of such a storage system program (i.e., concept of an application target of the storage system program) may vary from one program to another. For example, one storage system program requires a license to be obtained for every storage system that has the storage system program installed therein, while another storage system program requires only one license to be obtained for a plurality of storage systems.

The license structure may vary depending on a disk capacity to which the storage system program is applied. For example, the license structure includes a flat capacity rate plan which charges a flat rate if a capacity of a logical volume to which the storage program is applied is equal to or less than a predetermined value, and an as-used capacity rate plan which charges by an amount equal to a used capacity.

To manage the licenses, JP 2004-234559 A discloses a method of checking settings of each license and controlling execution of the program.

In addition, known examples of measures for managing data of a computer system include a method for migration of data as disclosed in JP 2001-337790 A. The migration refers to migration of data from one logical volume to another logical volume. The migration is executed to realize load balance or data lifecycle management (DLCM). For example, the load balance is averaging of a disk usage or a path usage. On the other hand, according to the DLCM, for example, when a value of data changes with a passage of time, the data is migrated to a storage system of costs suitable for the value.

Conventionally, the migration has been executed in one storage system. In other words, when disk drives different in performance, capacity, or the like are mixed together in one storage system, the data is migrated to the optimal disk drive (to be specific, logical volume composed of the optimal disk drive).

However, when the computer system includes a plurality of storage systems, data needs to be migrated among the plurality of storage systems. Such migration between the storage systems is also called migration between nodes.

SUMMARY

To execute migration between nodes, storage systems of a migration source and a migration destination need licenses of storage system programs to execute the migration between the nodes. Further, when a logical volume of a migration target is an application target of a certain storage system program, a license of the storage system program is necessary for the storage system of the migration destination.

When there are a plurality of storage systems likely to be migration destinations, there is a possibility that the plurality of storage systems will use the licenses of the storage system programs. In this case, when the licenses are purchased for all the storage systems likely to use the licenses, extra licenses not used in reality may be purchased to increase introduction costs of the storage system programs.

Furthermore, these problems occur when remote-copy is executed between the storage systems, or when the storage system is externally connected to another storage system, and a virtual logical volume (virtual volume) is supplied to a user.

According to an embodiment of this invention, there is provided a management computer that manages a plurality of storage systems interconnected via a network, each storage system including a logical volume that stores data, the management computer including: a transfer management module; and a license migration control module, wherein: the transfer management module decides a logical volume of a transfer source in a storage system of the transfer source of the data among the plurality of storage systems, and a logical volume of a transfer destination in a storage system of the transfer destination of the data stored in the logical volume of the transfer source; the transfer management module instructs the storage system to transfer the data upon reception of a request from the license migration control module; the license migration control module determines whether it is necessary or not to migrate a license of a program used for the logical volume of the transfer source from one of the plurality of storage systems to the storage system of the transfer destination; and when it is determined necessary to migrate the license, the license migration control module migrates license information regarding the license to the storage system of the transfer destination, and requests transfer execution of the data to the transfer management module.

According to this invention, it is not necessary to purchase a license for the storage system which does not actually use the storage system program. Thus, costs can be reduced. Moreover, according to this invention, the storage system program used at the migration source can be used at the migration destination. Similarly, the storage system program used at the copy source storage system or the externally connected storage system can be used at the copy destination storage system or the storage system which includes the virtual volume.

BRIEF DESCRIPTION OF THE DRAWINGS

FIG. 4 is an explanatory diagram of a license table according to the first embodiment.

FIG. 5 is an explanatory diagram of a configuration management table according to the first embodiment.

FIG. 6 is an explanatory diagram of a migration management table according to the first embodiment.

FIG. 7 is an explanatory diagram of a license type table according to the first embodiment.

FIG. 8 is an explanatory diagram of a used license table according to the first embodiment.

FIG. 9 is an explanatory diagram of a license migration management table according to the first embodiment.

FIG. 22 is an explanatory diagram of a copy pair management table according to the first embodiment.

FIG. 29 is an explanatory diagram of an external volume mapping table according to the second embodiment.

DETAILED DESCRIPTION OF THE PREFERRED EMBODIMENTS

Hereinafter, the preferred embodiments of this invention will be described with reference to the accompanying drawings.

First, a first embodiment will be described.

Figure 1:
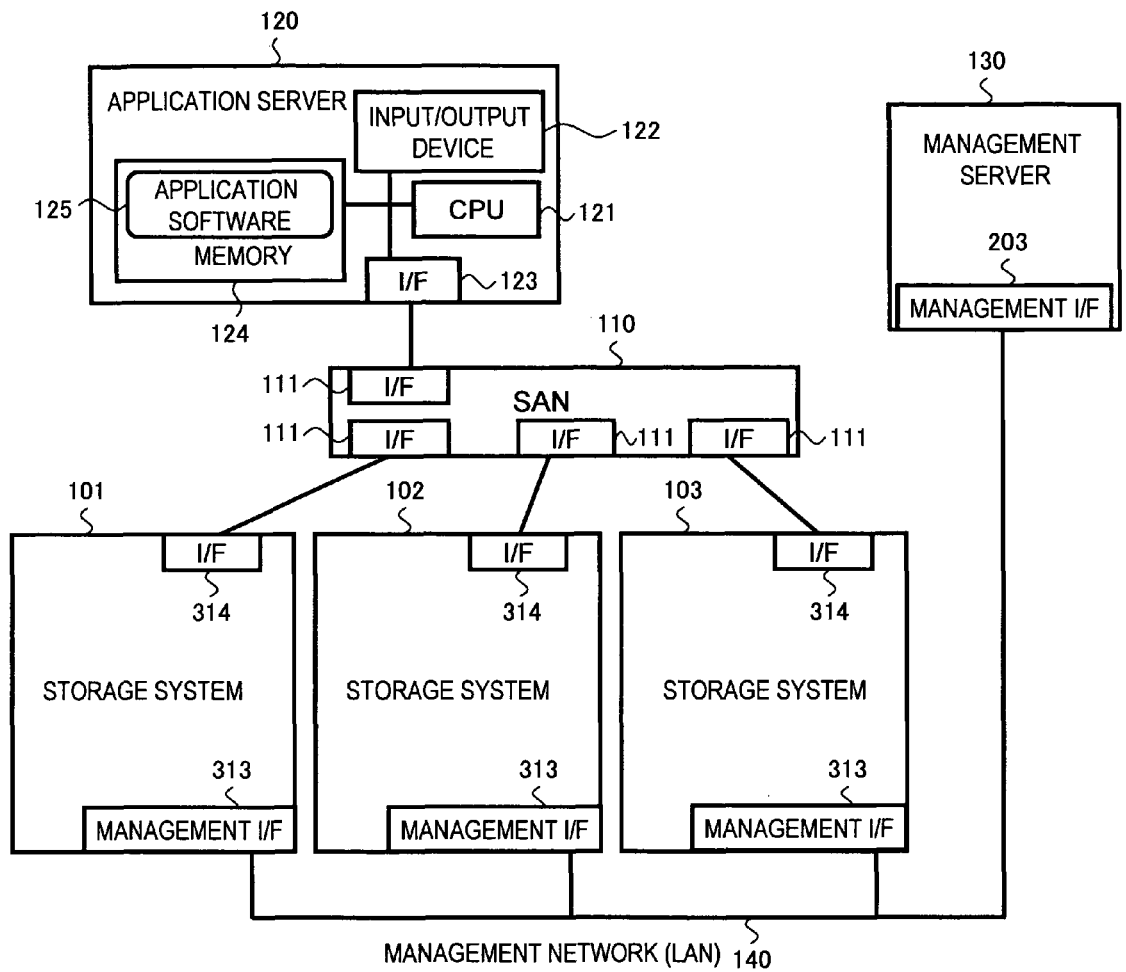
FIG. 1 is a block diagram showing a configuration of a computer system according to a first embodiment.

FIG. 1 is a block diagram showing a configuration of a computer system according to the first embodiment.

The computer system of this embodiment comprises storage systems 101 to 103, a storage area network (SAN) 110, an application server 120, a management server 130, and a management network 140.

The storage systems 101 to 103 store data written by the application server 120. An interface (I/F) 314 of each of the storage systems 101 to 103 is connected to the SAN 110, and communicates with the application server 120 or the other of the storage systems 101 to 103 via the SAN 110. On the other hand, a management I/F 313 of each of the storage systems 101 to 103 is connected to the management network 140, and communicates with the management server via the management network 140.

The computer system of this embodiment includes the three storage systems 101 to 103. However, this invention can be applied to a computer system which includes the optional number of storage systems. A configuration of the storage systems 101 or the like shown in FIG. 3 will be described in detail later.

The SAN 110 is a network for connecting the storage system 101 or the like to the application server 120. A switch fabric that comprises one or more fibre channel switches (FC-SW, not shown) is applied to the SAN 110 of this embodiment. However, other connection forms can be implemented when applied.

The interface (I/F) 111 is connected to the storage system 101 or the like, and the application server 120. Specifically, the I/F 111 is a FC-SW port.

The application server 120 is a computer used for user applications. The application server 120 of this embodiment comprises a CPU 121, an input/output device 122, an I/F 123, and a memory 124.

The CPU 121 is a processor for executing a program stored in the memory 124.

The input/output device 122 receives an input from a user, and outputs information to the user. For example, the input/output device 122 includes a keyboard, a mouse, a display screen (not shown), and the like.

The I/F 123 is connected to the I/F 111 of the SAN 110, and communicates with the storage system 101 or the like via the SAN 110.

The memory 124 is, for example, a semiconductor memory to store application software 125.

The application software 125 is a program executed by the CPU 121. The user of the application server 120 executes the application software 125 to perform an application. In this case, when necessary, the application server 120 writes data in the storage system 101 or the like, or reads data stored in the storage system 101 or the like.

The management server 130 is a computer for managing the storage system 101 or the like. A management I/F 203 of the management server 130 is connected to the management network 140, and communicates with the storage system 101 or the like via the management network 140. A configuration of the management server 130 shown in FIG. 2 will be described in detail later.

The management network 140 connects the management server 130 and the storage system 101, and mediates for communication therebetween. The management network 140 of this embodiment is a so-called local area network (LAN).

Figure 2:
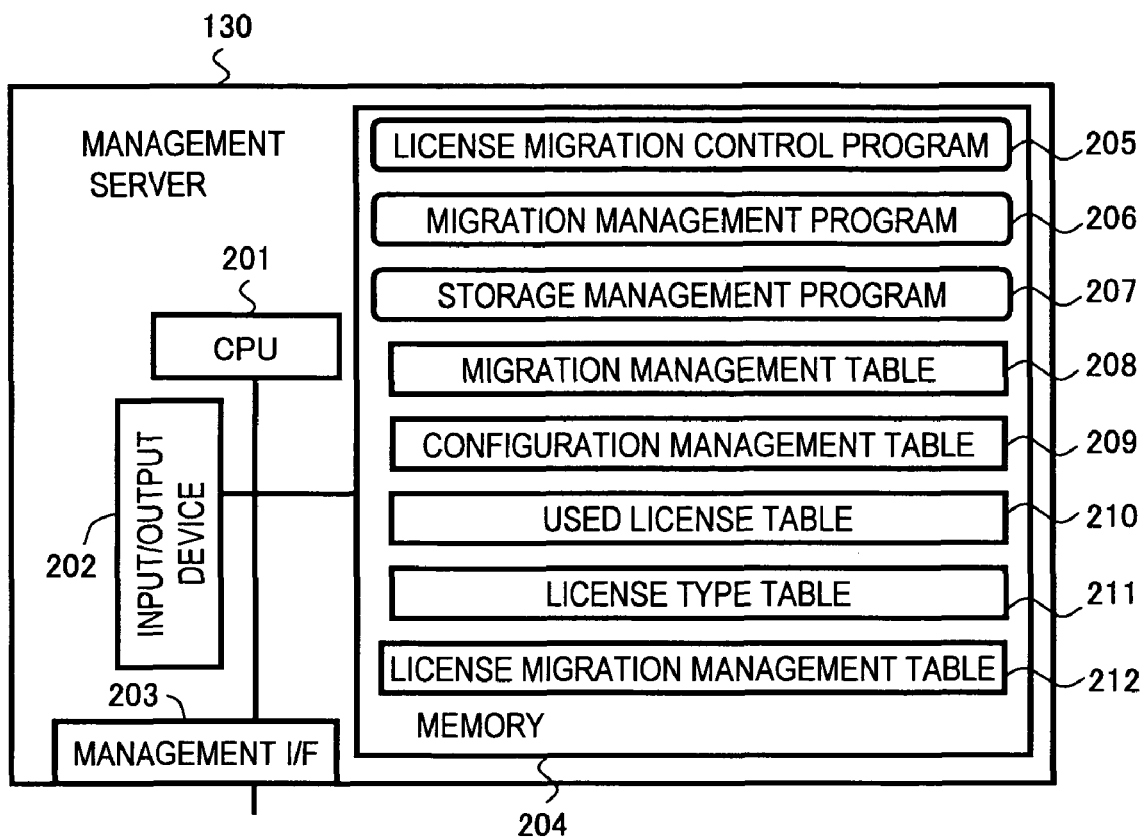
FIG. 2 is a block diagram showing a configuration of a management server according to the first embodiment.

FIG. 2 is a block diagram showing the configuration of the management server 130 according to the first embodiment.

The management server 130 of this embodiment comprises a CPU 201, an input/output device 202, a management I/F 203, and a memory 204.

The CPU 201 is a processor for executing a program stored in the memory 204.

The input/output device 202 receives an input from a user, and outputs information to the user. For example, the input/output device 202 includes a keyboard, a mouse, a display screen (not shown), and the like.

The management I/F 203 is an interface which communicates with the storage system 101 or the like via the management network 140.

The memory 204 is, for example, a semiconductor memory. The memory 204 stores various control programs or the like executed by the CPU 201, and a table referred to when the control programs or the like are executed. The memory 204 of this embodiment stores at least a license migration control program 205, a migration management program 206, a storage management program 207, a migration management table 208, a configuration management table 209, a used license table 210, a license type table 211, and a license migration management table 212.

The storage management program 207 collects resource information of the storage system 101 or the like. The collected resource information is registered in the configuration management table 209 shown in FIG. 5.

Figure 10:
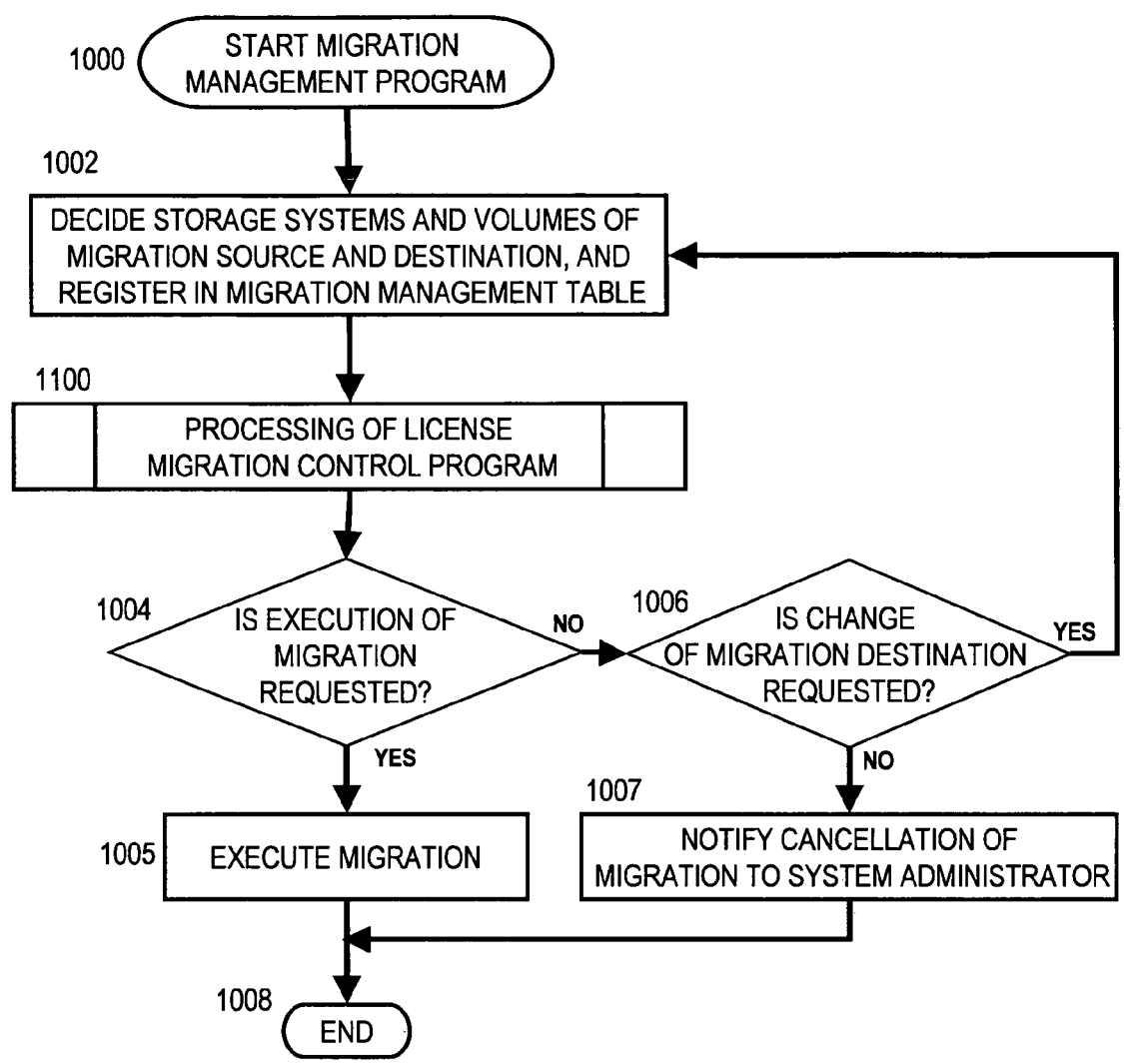
FIG. 10 is a flowchart of processing executed by a migration management program according to the first embodiment.

The migration management program 206 instructs migration of data between the storage systems as shown in FIG. 10. Information regarding an execution schedule of the migration is registered in the migration management table 208 shown in FIG. 6.

The migration means migration of data from a logical volume 331 of a migration source to that of a migration destination. Specifically, when the migration is executed, data of the logical volume 331 of the migration source (transfer source) is transferred to the logical volume of the migration destination (transfer destination), and stored. After the execution of the migration, no data is left in the logical volume 331 of the migration source.

The migration management program 206 instructs data transfer by such migration.

The license type table 211 registers a license structure applied in the computer system, shown in FIG. 7.

The used license table 210 registers information regarding a license of a program used by the storage system 101 or the like, shown in FIG. 8.

The license migration control program 205 refers to the information of each table to control a license migration between the storage systems as shown in FIGS. 11 to 16. Information regarding a schedule of a license migration decided by the license migration control program 205 is registered in the license migration management table 212 shown in FIG. 9.

According to this embodiment, the license means a right to use a storage system program 318. Presence of a license is proved by predetermined license information (license key). For example, the license key is a unique character or numeral string provided by a vender of the storage system program (described later).

The license key is moved to migrate the license. For example, when the storage system 101 holds a license of a certain program, the storage system 101 holds a license key to prove the license. When the license key migrates to the storage system 102, the storage system 101 loses a right to use the program. Instead, the storage system 102 obtains the right.

According to this embodiment, the program and the table are stored in the management server 130. However, these may be stored in the storage system 101 or the like, or a virtualization device (not shown).

Figure 3:
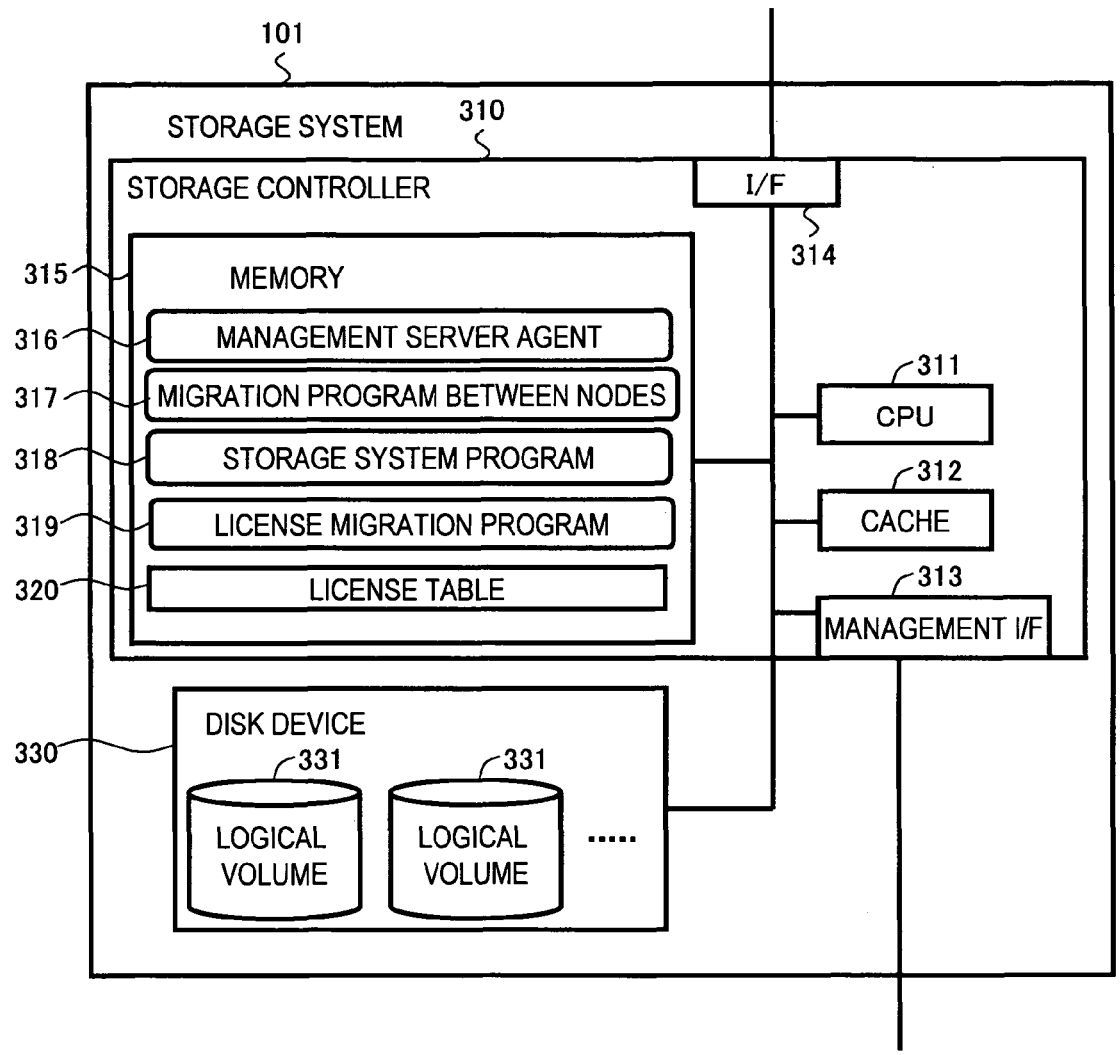
FIG. 3 is a block diagram showing a configuration of a storage system according to the first embodiment.

FIG. 3 is a block diagram showing the configuration of the storage system 101 according to the first embodiment.

Configurations of the storage systems 102 and 103 are similar to that of the storage system 101, and thus description thereof will be omitted.

The storage system 101 of this embodiment comprises a disk device 330 and a storage controller 310.

The disk device 330 stores data written from the application server 120. The disk device 330 comprises at least one disk drive (not shown) or the like. A storage area of the disk device 330 is divided into one or more logical volumes 331. The logical volume 331 is an area recognized as a logical disk drive by the application server 120.

The storage controller 310 controls writing of data in the disk device 330, or reading of data from the disk device 330. The storage controller 310 comprises a CPU 311, a cache 312, a management I/F 313, an I/F 314, and a memory 315.

The CPU 311 is a processor for executing a program stored in the memory 315.

The cache 312 is, for example, a semiconductor memory to temporarily store data written in the disk device 330 or data read from the disk device 330.

The management I/F 313 is an interface to communicate with the management server 130 via the management network 140.

The I/F 314 is an interface connected to the I/F 111 of the SAN 110 to communicate with the application server 120 via the SAN 110.

The memory 315 is, for example, a semiconductor memory. The memory 315 stores programs executed and information referred to by the CPU 311. The programs stored in the memory 315 are at least a management server agent 316, a migration program 317 between nodes, a storage system program 318, and a license migration program 319. The information stored in the memory 315 is at least a license table 320.

The management server agent 316 is a program to notify information regarding the storage system 101 to the management server 130.

The migration program 317 between the nodes is a program to migrate data of the logical volume 331 to the other storage system 102 or the like.

The storage system program 318 is a program of a storage system base to execute, e.g., creation/deletion of a logical volume, migration/relocation of data, control of host access to the logical volume, remote or local copying, or the like. The memory 315 may store a plurality of storage system programs 318.

Figure 17:
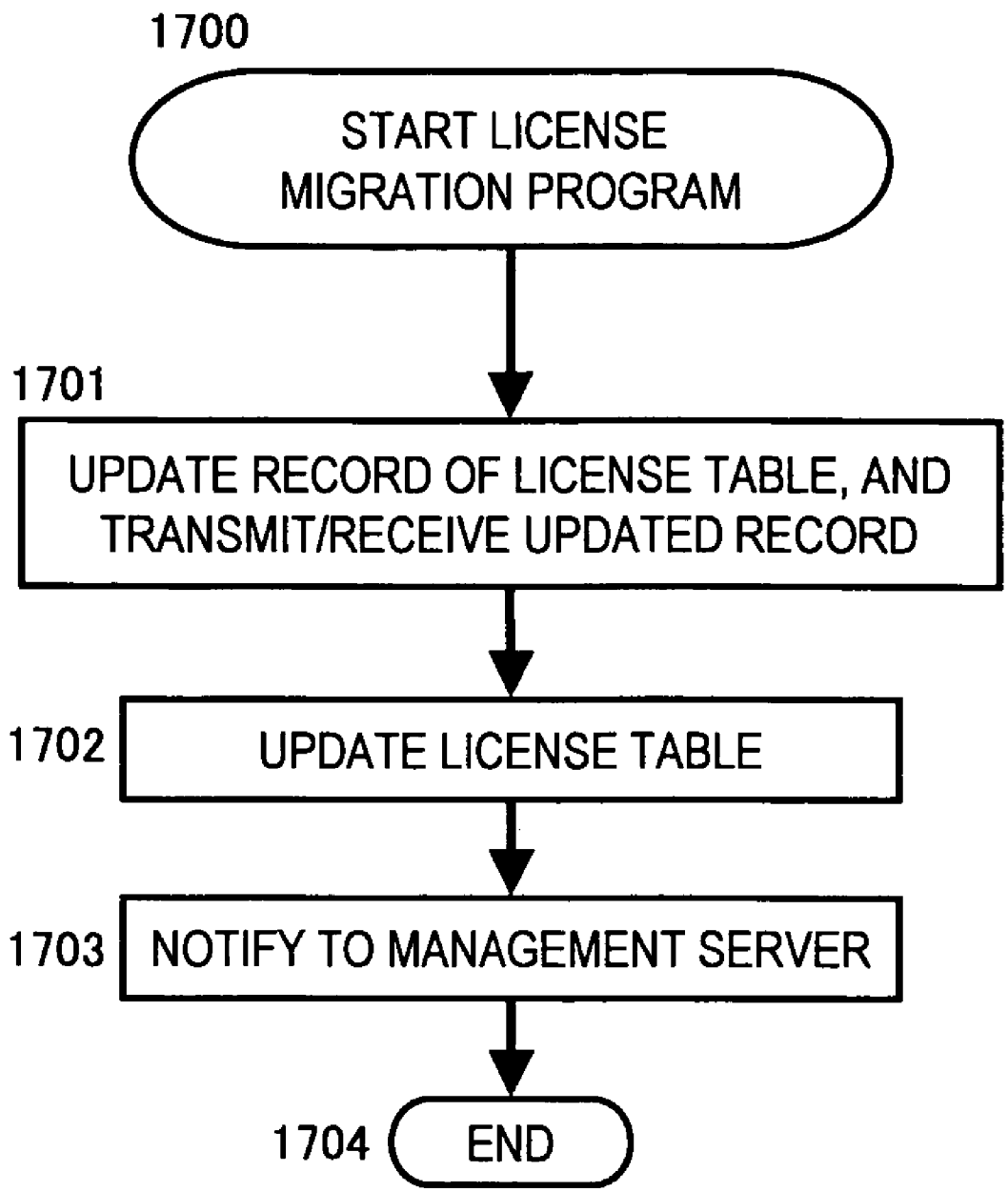
FIG. 17 is a flowchart of processing executed by the license migration program of the first embodiment.

The license migration program 319 transfers information of the license table 320 with the other storage system 102 or the like to migrate the license shown in FIG. 17.

The license table 320 registers information regarding a license of the storage system program 318 held by the storage system 101 shown in FIG. 4.

Next, the tables stored in the storage system 101 and the management server 130 of this embodiment will be described.

FIG. 4 is an explanatory diagram of the license table 320 of the first embodiment.

FIG. 4 shows an example of the license table 320 of the storage system 101. The license table 320 of the storage system 101 is for managing the license of the storage system program 318 installed in the storage system 101. Specifically, the license table 320 registers information regarding all the licenses held by the storage system 101 for all the storage system programs 318 installed in the storage system 101.

In the license table 320 of FIG. 4, there are registered pieces of information regarding two licenses. This means that the storage system 101 of this embodiment holds the two licenses.

In the license table 320, a license key 401 is a character or numeral string provided for each license by the vender when the license is purchased. In the example of FIG. 4, "XXXXA" and "XXXXB" are registered as license keys 401. Hereinafter, a license whose license key 401 is "XXXXA" will be simply referred to as license "XXXXA". The same will apply to the other license keys 401.

A program name 402 is a name of a storage system program targeted by each license. In the example of FIG. 4, "PP 1" are registered as program names 402 corresponding to the two license keys 401 of "XXXXA" and "XXXXB". This means that the two licenses target storage programs 318 of names "PP 1". Hereinafter, the storage system program 318 whose program name 402 is "PP 1" will be simply referred to as a storage system program "PP 1". The same will apply to the other program names 402.

An applied volume ID 403 is an identifier (ID) of the logical volume 331 to which each license is applied. In the example of FIG. 4, applied volume ID's 403 corresponding to the license key 401 "XXXXA" are "VOL 1" and "VOL 2". This means that the license "XXXXA" uses the storage system program "PP 1" in the logical volumes "VOL 1" and "VOL 2" (i.e., the storage system program "PP 1" is used by targeting the logical volumes "VOL 1" and "VOL 2"). The logical volume whose logical volume ID 403 is "VOL 1" will be simply referred to as a logical volume "VOL 1". The same will apply to the other logical volume ID's 403.

On the other hand, an applied volume ID 403 corresponding to the license key 401 "XXXXB" is "unused". This means that the license "XXXXB" is not applied to any logical volume 331. In other words, at a point of this time, the license "XXXXB" is unused.

A maximum capacity 404 is a maximum value of a capacity of the logical volume 331 to which each license is permitted to be applied. According to this embodiment, a license structure of a flat capacity rate plan is applied. For example, when a system administrator purchases a license whose maximum capacity 404 is 15 terabytes (TB), the storage system program 318 can be used in the logical volume 331 of a capacity up to a maximum 15 TB based on the license. When one license is applied to a plurality of logical volumes, a total value of capacities of the logical volumes only needs to be 15 TB or less.

In the example of FIG. 4, "15 TB" and "10 TB" are registered as maximum capacities 404 corresponding to the two license keys 401 of "XXXXA" and "XXXXB".

The used capacity 405 is a capacity of the logical volume 331 to which each license is actually applied. In the example of FIG. 4, "15 TB" is registered as a used capacity 405 corresponding to the license key 401 "XXXXA". This means that a total value of capacities of the logical volumes "VOL 1" and "VOL 2" to which the license "XXXXA" is applied is 15 TB. This value is equal to the value "15 TB" of the maximum capacity 404. Thus, the license "XXXXA" cannot be applied to other logical volumes any more.

On the other hand, the license "XXXXB" is not applied to any logical volume 331. Accordingly, "0 TB" is registered as a used capacity 405 corresponding to the license key 401 "XXXXB". In other words, the license "XXXXB" can be newly applied to a logical volume 331 whose capacity is 10 TB or less.

The storage systems 102 and 103 hold license tables 320 similar to the above. However, the license tables 320 of the storage systems 102 and 103 store information regarding licenses held by the storage systems 102 and 103 (not shown).

FIG. 5 is an explanatory diagram of the configuration management table 209 of the first embodiment.

The configuration management table 209 registers resource information of each storage system 101 or the like collected by the storage management program 207. Specifically, the configuration management table 209 registers information regarding all the logical volumes 331 stored in the storage system 101 or the like for each logical volume 331.

Referring to FIG. 5, one row of the configuration management table 209 corresponds to one logical volume 331. For each logical volume 331, the configuration management table 209 registers a storage system name 501, a model 502, a logical volume ID 503, a logical volume size 504, a used program name 505, and a path 506.

The storage system name 501 is an identifier of the storage system 101 or the like which stores each logical volume 331. In the example of FIG. 5, two "storage systems 101", one "storage system 102", and one "storage system 103" are registered. These correspond to the storage systems 101 to 103 of FIG. 1. The two "storage systems 101" are registered because two logical volumes 331 are stored therein.

The model 502 is a model (type) of each storage system 101 or the like. As there may be a limitation on models to be targeted by a license, the management server 130 manages the model of each storage system 101 or the like. In the example of FIG. 5, the models 502 of the storage systems 101 and 102 are "A", while the model 502 of the storage system 103 is "B".

The logical volume ID 503 is an identifier (ID) of each logical volume 331. In the example of FIG. 5, logical volume ID's 503 of the two logical volumes 331 stored in the storage systems 101 are respectively "VOL 1" and "VOL 2". Volume ID's of the logical volumes 331 stored in the storage systems 102 and 103 are respectively "VOL 3" and "VOL 4".

The logical volume size 504 is a data capacity set for each logical volume 331. In the example of FIG. 5, logical volume sizes 504 of the logical volumes "VOL 1" and "VOL 4" are "10 TB", while logical volume sizes 504 of the logical volumes "VOL 2" and "VOL 3" are "5 TB".

The used program name 505 is a name of a storage system program 318 used for each logical volume 331. In the example of FIG. 5, storage system programs "PP 1" and "PP 2" are used for the logical volumes "VOL 1" and "VOL 2". On the other hand, a storage system program 318 is used for neither of the logical volumes "VOL 3" and "VOL 4".

The path 506 is information regarding a path of data set between the storage systems 101 or the like. For example, referring to FIG. 5, "102" and "103" are registered as paths 506 corresponding to the storage systems 101. This means that a path is set between the storage systems 101 and 102, and a path is similarly set between the storage systems 101 and 103. Specifically, a path is set from the I/F 314 of the storage system 101 via the I/F 111 of the SAN 10 and another I/F 111 to the I/F 314 of the storage system 102 shown in FIG. 1. The same applies between the storage systems 101 and 103.

When there is a path set between the two storage systems 101 or the like, migration of data can be executed through the path between the two storage systems 101 or the like. Moreover, a license can be migrated through the set path. Specifically, the license key 401 migrates through the set path.

Contents registered in the path 506 may be collected from each storage system 101 or the like by the management server 130 (or specific storage system 101 or the like). Alternatively, the storage systems 101 or the like receive information from each other to hold the same contents.

In the example of FIG. 5, the paths are respectively set between the storage systems 101 and 102, between the storage systems 101 and 103, and between the storage systems 102 and 103. Thus, in any combination of the storage systems 101 to 103, migration of data can be executed.

FIG. 6 is an explanatory diagram of the migration management table 208 of the first embodiment.

In the migration management table 208, for migration of data scheduled to be executed, pieces of information regarding logical volumes 331 of a migration source and a migration destination are registered by the migration management program 206.

In the migration management table 208, a storage system name 611 and a logical volume ID 612 of the migration source are registered in a migration source 610. On the other hand, in a migration destination 620, a storage system name 621 and a logical volume ID 622 of the migration destination are registered.

In the example of FIG. 6, "storage system 101" and "VOL 2" are respectively registered as the storage system name 611 and the logical volume ID 612 of the migration source 610. On the other hand, "storage system 102" and "VOL 3" are respectively registered as the storage system name 621 and the logical volume ID 622 of the migration destination 620. This means that migration of data is scheduled to be executed from the logical volume "VOL 2" of the storage system 101 to the logical volume "VOL 3" of the storage system 102.

FIG. 7 is an explanatory diagram of the license type table 211 of the first embodiment.

In the license type table 211, a license structure applied to the storage system program 318 used in the computer system is registered.

The license type table 211 comprises a program name 701, a license unit 702, and a rate structure 703.

The program name 701 is a name of the storage system program 318 used in the computer system. As shown in the configuration management table 209 of FIG. 5, the storage system programs "PP 1" and "PP 2" are used in the computer system of this embodiment. Thus, "PP 1" and "PP 2" are registered as program names 701.

The license unit 702 is a scope of application of one license. For example, referring to FIG. 7, the license unit 702 of the storage system program "PP 1" is "storage system". This means that one license of the storage system program "PP 1" is applied to one storage system 101 or the like. For example, when one license of the storage system program "PP 1" is applied to the storage system 101, the other storage system 102 or the like cannot use the storage system program "PP 1" based on the license.

The license unit 702 may contain information indicating a model of a storage system to which the license can be applied. For example, the license unit 702 may contain information (not shown) indicating that the license of the storage system program "PP 1" is applied only to a model "A" (see model 502 of the configuration management table 209 shown in FIG. 5).

On the other hand, the license unit 702 of the storage system program "PP 2" is "computer system (divisible)". This means that one license of the storage system program "PP 2" is applied to the entire computer system of this embodiment shown in FIG. 1, and one license can be divided for a plurality of storage systems 101 or the like to be applied.

For example, when the license of the storage system program "PP 2" is applied to the computer system at a maximum capacity of 20 TB, the 20 TB can be divided into 10 TB, 5 TB, and 5 TB to be applied to different logical volumes 331. For example, the 10 TB may be applied to the logical volume "VOL 1" of the storage system 101, the 5 TB may be applied to the logical volume "VOL 2", and the remaining 5 TB may be applied to the logical volume "VOL 3" of the storage system 102.

The rate structure 703 is a rate structure of a license applied to each storage system program 318. According to this embodiment, for any storage system program 318, a flat capacity rate is applied for each 1 TB.

FIG. 8 is an explanatory diagram of the used license table 210 of the first embodiment.

The used license table 210 is for managing the license of the storage system program 318 installed in the storage system 101 or the like in the computer system. Specifically, in the used license table 210, for all the storage system programs 318 in the computer system, pieces of information regarding all the licenses held by the computer system are registered.

In the used license table 210 of FIG. 8, pieces of information regarding three licenses are registered. This means that the computer system of this embodiment hold three licenses.

In the used license table 210, for each license, a license key 801, a program name 802, an applied storage system name 803, an applied volume ID 804, a maximum capacity 805, and a used capacity 806 are registered. Among these, the license key 801, the program name 802, the applied volume ID 804, the maximum capacity 805, and the used capacity 806 are respectively similar to the license key 401, the program name 402, the applied volume ID 403, the maximum capacity 404, and the used capacity 405 of the license table 320 shown in FIG. 4, and thus detailed description thereof will be omitted.

In the used license table 210, pieces of information regarding licenses "XXXXA" and "XXXXB" are similar to those of the license table 320 except the applied storage system name 803, and thus detailed description thereof will be omitted.

The applied storage system name 803 is a name of a storage system to which each license is applied. According to this embodiment, all the licenses are applied to the storage systems 101.

In the example of FIG. 8, a license "XXXXC" of the storage system program "PP 2" is applied to the logical volumes "VOL 1" and "VOL 2" of the storage systems 101. This license can be applied up to 20 TB. Actually, however, the license is applied up to 15 TB (total of logical volume sizes of VOL 1 and VOL 2). Thus, the license "XXXXC" can be further applied to an optional logical volume 331 whose capacity is 5 TB or less.

FIG. 9 is an explanatory diagram of the license migration management table 212 of the first embodiment.

In the license migration management table 212, information regarding the storage system program 318 which needs to migrate a license associatively with migration of data scheduled to be executed is registered. Specifically, in the license migration management table 212, a migration program name 901, a migration capacity 902, a migration source 903, and a migration destination 904 are registered. As described later, the license migration management table 212 is created and updated by the license migration control program 205 shown in FIGS. 11 to 16.

The migration program name 901 is a name of the storage system program 318 which needs to migrate the license associatively with the migration of data scheduled to be executed.

In other words, it is a name of the storage system program currently used for the logical volume 331 of the migration source.

The migration capacity 902 is a capacity of a license to migrate. In other words, it is a capacity of the logical volume 331 of the migration source.

The migration source 903 is a name of the storage system 101 or the like of the license migration source. As described later, the migration source 903 may be updated by the license migration control program 205 to be different from a data migration source.

The migration destination 904 is a name of the storage system 101 or the like of the license migration destination.

As shown in FIG. 6, the example of FIG. 9 shows the license migration table 212 when data of the logical volume "VOL 2" of the storage system 101 is migrated to the logical volume "VOL 3" of the storage system 102.

In this case, "PP 1" and "PP 2" are registered as migration program names 901, and "5 TB" is registered as a corresponding migration capacity 902 (see used program name 505 and logical volume size 504 of the configuration management table 209 shown in FIG. 5). In both of "PP 1" and "PP 2", "storage system 101" is stored as a migration source 903, and "storage system 102" is registered as a migration destination 904 (see storage system name 611 and storage system name 621 of the migration management table 208 shown in FIG. 6).

Next, a program executed according to this embodiment will be described. In the description below, when the program is a subject, in reality, processing is executed by a CPU (CPU 201 or 311) which executes the program.

FIG. 10 is a flowchart of processing executed by the migration management program 206 of the first embodiment.

For example, the migration management program 206 is executed when a need arises to migrate data for load balance or DLCM of the computer system.

Upon a start of the processing (1000), the migration management program 206 decides a storage devices 101 or the like and logical volumes 331 of migration source and destination of data, and registers pieces of information thereof in the migration management table 208 (1002). A method of deciding the migration source 610 and the migration destination 620 may be similar to conventional load balance or DLCM.

Next, the migration management, program 206 calls the license migration control program 205 to execute processing (1100). The processing executed here will be described in detail later shown in FIGS. 11 to 16.

Next, the migration management program 206 determines whether execution of migration is requested or not as a result of the processing of the license migration control program 205 (1004).

If the request of the execution of the migration is determined in the step 1004, migration according to the migration management table 208 can be executed. Thus, the migration management program 206 executes migration according to the contents registered in the migration management table 208 (1005) to finish the processing (1008).

On the other hand, if no request of the execution of the migration is determined in the step 1004, the migration according to the migration management table 208 cannot be executed. In this case, the migration management program 206 determines whether a change of the migration destination 620 is requested or not as a result of the processing of the license migration control program 205 (1006).

Figure 11:
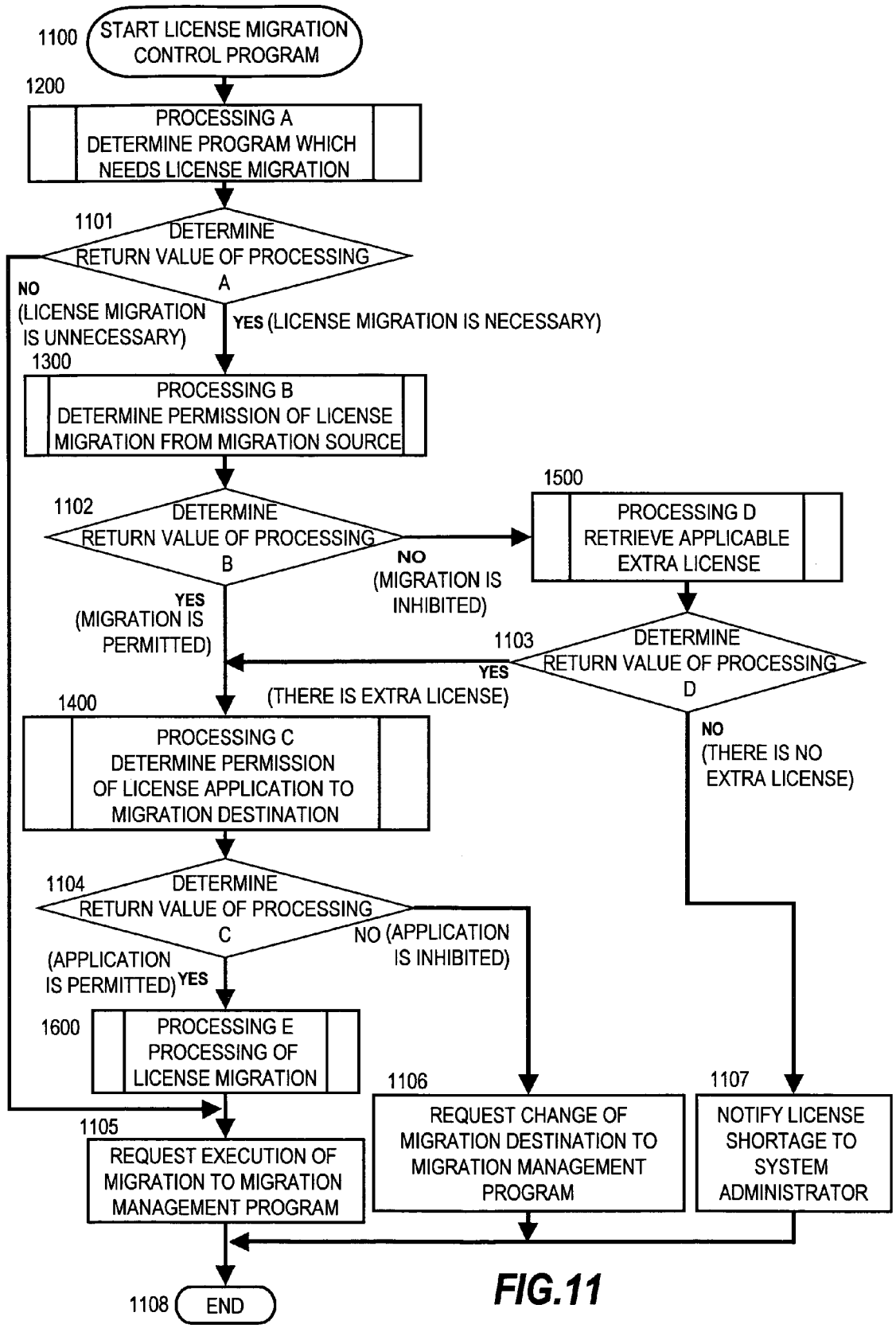
FIG. 11 is a flowchart of processing executed by a license migration control program according to the first embodiment.

If no request of the change of the migration destination 620 is determined in the step 1006, migration cannot be executed because of a license shortage shown in FIG. 11. Accordingly, the migration management program 206 sends a notice of migration cancellation to the system administrator (1007), and finishes the processing without executing any migration (1008). For example, the notice of the step 1007 may be displayed on the input/output device 202 of the management server 130.

On the other hand, if the request of the change of the migration destination 620 is determined in the step 1006, a license cannot be migrated to the decided migration destination 620 while there are enough licenses shown in FIG. 11. In other words, the license may be migrated by changing the migration destination 620. Accordingly, the migration management program 206 returns to the step 1002, decides a migration destination 620 again according to the request, and registers the migration destination 620 in the migration management table 208 (1002). Then, processing of the step 1100 and after is executed.

FIG. 11 is a flowchart of processing executed by the license migration control program 205 of the first embodiment.

The processing of the license migration control program 205 is started when it is called by the migration management program 206 in the step 1100 of FIG. 10.

Upon a start of the processing (1100), the license migration control program 205 executes processing A (1200). The processing A is for determining a storage system program 318 which needs to migrate a license to the logical volume 331 of the migration destination. Specifically, by the processing A, determination is made as to a need to migrate a license of a given storage program 318 to the logical volume 331 of the migration destination. Further, when the migration of the license is necessary, determination is made as to which of the storage system programs 318 needs to migrate its license. The processing A shown in FIG. 12 will be described in detail later.

Next, the license migration control program 205 determines a return value of the processing A (1101).

If the return value of the processing A is determined to be "NO" in the step 1101, it is not necessary to migrate licenses of any storage system programs 318. In other words, migration can be executed without migrating any license. Thus, the license migration control program 205 proceeds to a step 1105 (described later).

On the other hand, if the return value of the processing A is determined to be "YES", it is necessary to migrate a license of at least one of the storage system programs 318. In this case, the license migration control program 205 executes processing B (1300).

The processing B is for determining whether a license can be migrated or not from the logical volume 331 of the migration source to that of the migration destination. The processing B shown in FIG. 13 will be described later.

Next, the license migration control program 205 determines a return value of the processing B (1102).

If the return value of the processing B is determined to be "YES" in the step 1102, a necessary license can be migrated to the logical volume 331 of the migration destination. In this case, the license migration control program 205 proceeds to a step 1400 to execute processing C (described later).

On the other hand, if the return value of the processing B is determined to be "NO" in the step 1102, the necessary license cannot be migrated to the logical volume 331 of the migration destination. In this case, the license migration control program 205 executes processing D (1500).

The processing D is for determining whether there is an extra license or not to be applied to the logical volume 331 of the migration destination. The processing D shown in FIG. 15 will be described in detail later.

Next, the license migration control program 205 determines a return value of the processing D (1103).

If the return value of the processing D is determined to be "NO" in the step 1103, there is no extra license to be applied to the logical volume 331 of the migration destination. In this case, there is a shortage of licenses to be applied to the migration destination. Thus, the license migration control program 205 notifies the license shortage to the system administrator (1107) to finish the processing (1108).

On the other hand, if the return value of the processing D is determined to be "YES" in the step 1103, there is an extra license to be applied to the logical volume 331 of the migration destination. In this case, the license migration control program 205 executes the processing C (1400).

Even in the case of storage system programs 318 of similar functions, program names or license forms may vary because of a difference or the like of models (models 502) of the storage systems 101 which use the programs. The processing C is for determining whether the necessary license can be applied or not to the logical volume 331 of the storage system 101 or the like of the migration destination. The processing C shown in FIG. 14 will be described in detail later.

The license migration control program 205 executes the processing C, and then determines its return value (1104).

If the return value of the processing C is determined to be "NO" in the step 1104, the necessary license cannot be applied to the logical volume 331 of the migration destination. In this case, there is not exactly a shortage of necessary licenses. Thus, by changing the migration destination, migration may be executed. Accordingly, the license migration control program 205 requests a change of the migration destination to the migration management program 206 (1106) to finish the processing (1108).

Even in the case of different storage system programs 318, as long as there are those of similar functions, licenses thereof may be migrated to the migration destination. In this case, the storage system programs 318 of similar functions are retrieved immediately before the step 1106. If they are present, determination is made as to whether licenses thereof can be migrated to the migration destination or not (not shown). If a result of the determination shows that the licenses can be migrated to the migration destination, the licenses are registered as licenses scheduled to migrate in the license migration management table 212, and the process proceeds to a step 1105 (described later).

If the return value of the processing C is determined to be "YES" in the step 1104, a necessary license can be migrated to the logical volume 331 of the migration destination. In this case, the license migration control program 205 proceeds to a step 1600 to execute processing E (described later).

The processing E is for migrating a license. The processing E shown in FIG. 16 will be described in detail later.

Next, the license migration control program 205 requests execution of migration to the migration management program 206 (1105), and finishes the processing (1108).

Figure 12:
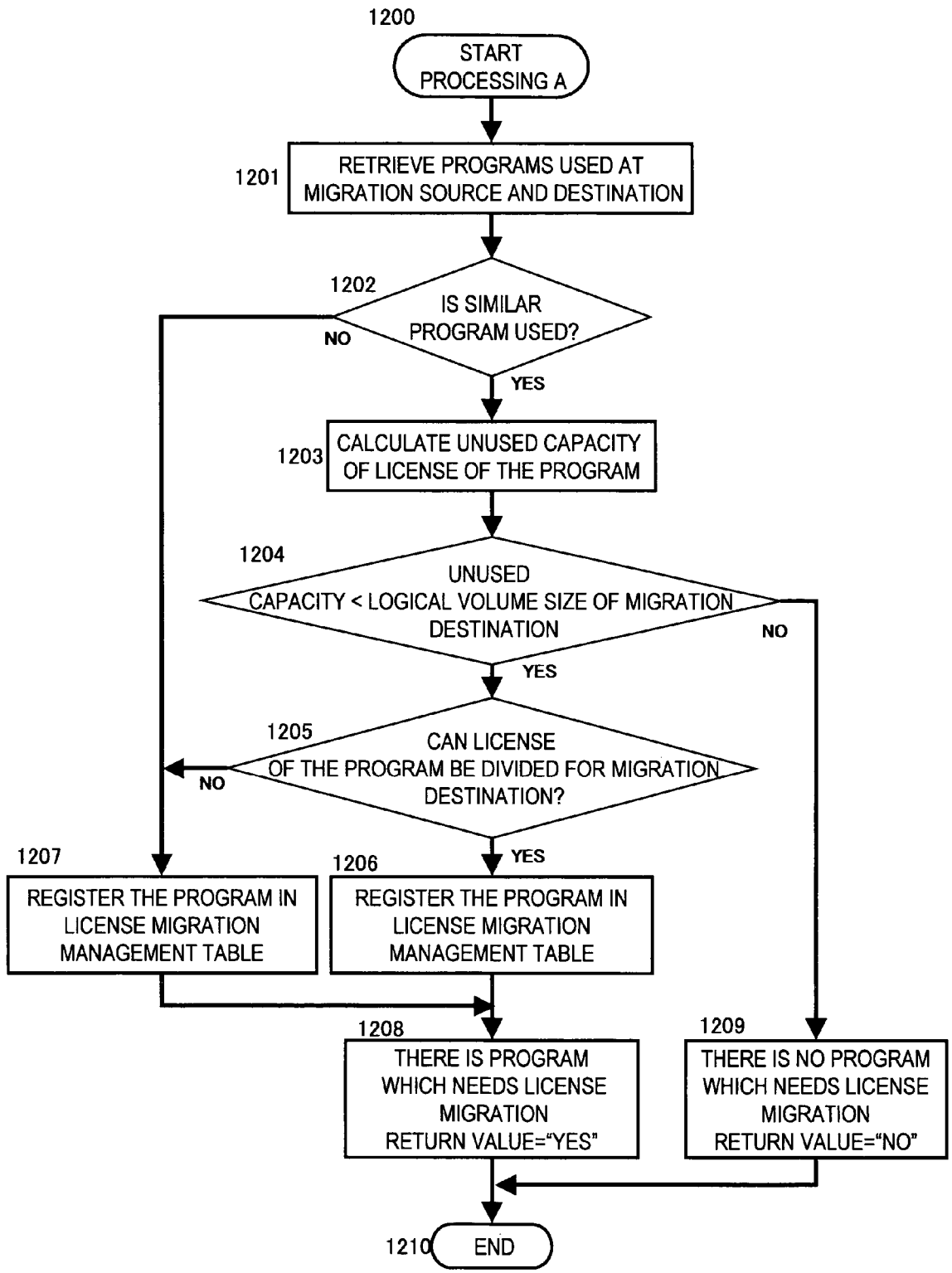
FIG. 12 is a flowchart of processing executed by the license migration control program of the first embodiment to determine a storage system program which needs to migrate a license.

FIG. 12 is a flowchart of the processing A executed by the license migration control program 205 according to the first embodiment.

Upon a start of the processing A in the step 1200 of FIG. 11, the license migration control program 205 retrieves storage system programs 318 used for the logical volume 331 of the migration source and the storage system 101 or the like of the migration destination (1201).

Specifically, the license migration control program 205 refers to the configuration management table 209 and the migration management table 208. The used program name 505 corresponding to the storage system name 501 the same as the storage system name 611 of migration source 610 and the logical volume ID 503 the same as the logical volume ID 612 of migration source 610 is a storage system program 318 used for the logical volume 331 of the migration source. On the other hand, the used program name 505 corresponding to the storage system name 501 the same as the storage system name 621 of the migration destination 620 is a storage system program 318 used for the storage system 101 or the like of the migration destination.

Next, the license migration control program 205 refers to a result of the retrieval in the step 1201 to determine whether the same storage system program 318 is used or not for the logical volume 331 of the migration source and the storage system 101 or the like of the migration destination (1202).

If the same storage system program 318 is determined not to be used in the step 1202, a program the same as the storage system program 318 used for the logical volume 331 of the migration source is not used for the storage system 101 or the like of the migration destination. In this case, the process proceeds to a step 1207 (described later). Hereinafter in the description of FIG. 12, the storage system program 318 used for the logical volume 331 of the migration source will be referred to as "the relevant storage system program 318".

On the other hand, if the same storage system program 318 is determined to be used in the step 1202, a program the same as the relevant storage system program 318 is used for the storage system 101 or the like of the migration destination. In this case, a license already applied at the storage system 101 or the like of the migration destination may be applicable to the logical volume 331 of the migration destination. Accordingly, the license migration control program 205 refers to the used license table 210 to calculate an unused capacity of the license of the relevant storage system program 318 (1203). The unused capacity is a value obtained by subtracting the used capacity 806 from the maximum capacity 805.

Next, the license migration control program 205 refers to the configuration management table 209 and the migration management table 208 to determine whether the unused capacity calculated in the step 1203 is smaller or not than the logical volume size 504 of the logical volume 331 of the migration destination (1204).

If the unused capacity calculated in the step 1203 is determined not to be smaller that the logical volume size 504 of the logical volume 331 of the migration destination in the step 1204, an unused capacity of the license already applied at the storage system 101 or the like of the migration destination can be applied to the logical volume 331 of the migration destination. Accordingly, the license migration control program 205 determines that there is no storage system program 318 which needs a license migration (i.e., it is not necessary to migrate the license in any of the storage system programs 318) (1209). In this case, a return value of the processing A is set to "NO".

On the other hand, if the unused capacity calculated in the step 1203 is determined to be smaller than the logical volume size 504 of the logical volume 331 of the migration destination in the step 1204, even when the unused capacity of the license applied at the storage system 101 or the like at the migration destination is applied to the logical volume 331 of the migration destination, there still is a shortage of licenses.

In this case, the license migration control program 205 determines whether the license of the relevant storage system program 318 can be divided to be applied to the migration destination or not (1205). Specifically, the license migration control program 205 refers to the license type table 211. Then, when a license unit 702 of the license of the relevant storage system program 318 is "computer system (divisible)", it is determined that the license can be divided to be applied to the migration destination.

If it is determined in the step 1205 that the license of the relevant storage system program 318 can be divided to be applied to the migration destination, a license alone among those of the relevant storage system program 318 which is equivalent to a shortage can be migrated from the migration source to the migration destination. Accordingly, the license migration control program 205 registers the relevant storage system program 318 in the license migration management table 212 (1206).

In this case, a name of the relevant storage system program 318 is registered as a migration program name 901. As a migration capacity 902, a value obtained by subtracting the unused capacity calculated in the step 1203 from the logical volume size 504 of the logical volume 331 of the migration destination is registered. As a migration source 903 and a migration destination 904, names of the storage systems 101 or the like of the migration source and the migration destination are registered.

On the other hand, if it is determined in the step 1205 that the license of the relevant storage system program 318 cannot be divided to be applied to the migration destination, all the licenses of the relevant storage system program 318 must be migrated from the migration source to the migration destination. Accordingly, the processing proceeds to a step 1207.

In the step 1207, if the relevant storage system program 318 is used for the logical volume 331 of the migration source, the license migration control program 205 registers the relevant storage system program 318 in the license migration management table 212.

In this case, the name of the relevant storage system program 318 is registered as a migration program name 901. As a migration capacity 902, the logical volume size 504 of the logical volume 331 of the migration destination is registered. As a migration source 903 and a migration destination 904, the names of the storage systems 101 or the like of the migration source and the migration destination are registered.

If the relevant storage system program 318 is not used for the logical volume 331 of the migration source, it is not necessary to migrate any license.

After the execution of the step 1206 or 1207, the license migration control program 205 determines that there is a storage system program 318 which needs a license migration (i.e., license of the relevant storage system program 318 must be migrated) (1208). At this time, a return value of the processing A is set to "YES".

Thus, the processing A comes to an end (1210).

For example, when the configuration management table 209 and the migration management table 208 are as shown in FIGS. 5 and 6, the storage system programs "PP 1" and "PP 2" are used for the logical volume "VOL 2" of the storage system 101 of the migration source (1201). On the other hand, the storage system program 318 is not used in the storage system 102 of the migration destination (1201). Accordingly, in the step 1202, it is determined that the same storage system program 318 is not used. In the step 1207, the storage system programs "PP 1" and "PP 2" are registered in the license migration management table 212.

In this case, as shown in FIG. 9, as a migration capacity 902 corresponding to the "PP 1" and the "PP 2", a value "5 TB" of the logical volume size 504 of the logical volume "VOL 3" of the storage system 102 of the migration destination is registered. A value "storage system 101" of the storage system name 611 of the migration source 610 is registered as a migration source 903, and a value "storage system 102" of the storage system name 621 of the migration destination 620 is registered as a migration destination 904.

Figure 13:
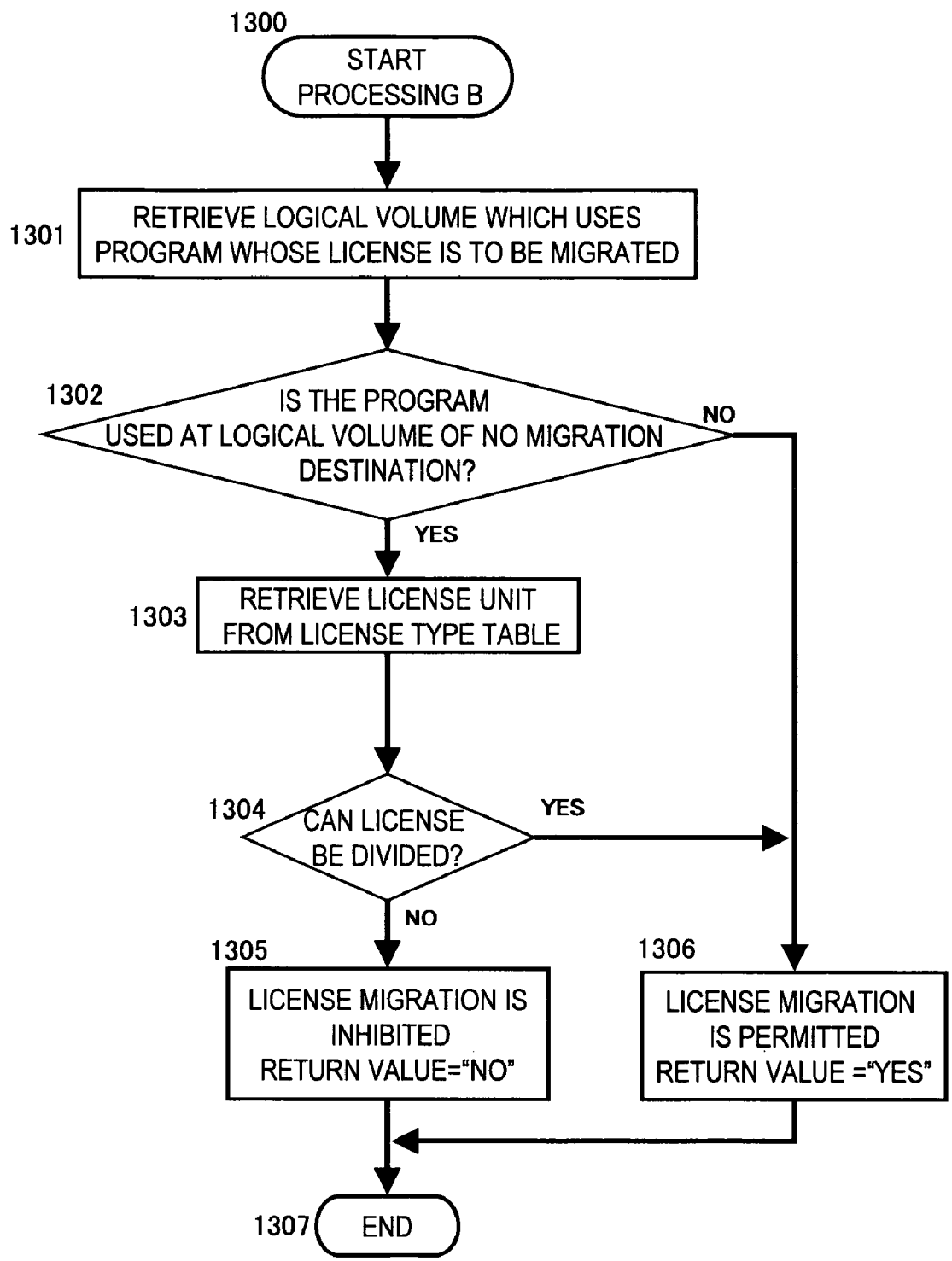
FIG. 13 is a flowchart of processing executed by the license migration control program of the first embodiment to determine whether the license can be migrated or not to a migration destination.

FIG. 13 is a flowchart of the processing B executed by the license migration control program according to the first embodiment.

Upon a start of the processing B in the step 1300 of FIG. 11, the license migration control program 205 retrieves a logical volume 331 which uses the storage system program 318 whose license is to be migrated (1301).

Specifically, the license migration control program 205 refers to the license migration management table 212. The storage system program 318 indicated by a migration program name 901 of the license migration management table 212 (in the example of FIG. 9, storage system programs "PP 1" and "PP 2") is a program whose license is to be migrated.

Further, the license migration control program 205 refers to the used program name 505 of the configuration management table 209 to retrieve the logical volume 331 which uses the storage system program 318 whose license is to be migrated. In the example of FIG. 5, the logical volumes "VOL 1" and "VOL 2" of the storage systems 101 use the storage system programs "PP 1" and "PP 2" whose licenses are to be migrated.

Next, the license migration control program 205 refers to the storage system name 501, the logical volume ID 503, and the used program name 505 of the configuration management table 209 to determine whether the storage system program 318 whose license is to be migrated is used or not for the logical volume 331 which is not a migration source (1302).

In the example of FIG. 5, the storage system programs "PP 1" and "PP 2" whose licenses are to be migrated are used for the logical volumes "VOL 1" and "VOL 2" of the storage systems 101. When the migration source is the logical volume "VOL 2" of the storage system 101 as shown in FIG. 6, the storage system programs "PP 1" and "PP 2" whose licenses are to be migrated are used for the logical volume "VOL 1" of the storage system 101 while it is not a migration source.

If it is determined in the step 1302 that the storage system program 318 whose license is to be migrated is not used for the logical volume 331 which is not a migration source, the license migration control program 205 determines that the license can be migrated to the migration destination (1306). In this case, a return value of the processing B is set to "YES". Then, the processing B comes to an end (1307).

On the other hand, if it is determined in the step 1302 that the storage system program 318 whose license is to be migrated is used for the logical volume 331 which is not a migration source, the license migration control program 205 refers to the license type table 211 to retrieve the license unit 702 of the storage system program 318 whose license is to be migrated (1303).

In the example of FIG. 7, the license units 702 of the storage system programs "PP 1" and "PP 2" whose licenses are to be migrated are respectively "storage system" and "computer system (divisible)".

Next, the license migration control program 205 refers to the license unit 702 retrieved in the step 1303 to determine whether its license can be divided to be applied to the migration source and the migration destination (1304).

In the example of FIG. 7, the license unit 702 of the storage system program "PP 1" is "storage system". In other words, one license of the storage program "PP 1" is applied to one storage system 101 or the like. In this case, one license can be applied to a plurality of logical volumes 331 in one storage system 101 or the like to which it is applied. However, one license cannot be applied to a plurality of storage systems 101 or the like. Accordingly, regarding the storage system program "PP 1", the license migration control program 205 determines that the license cannot be divided to be applied to the migration source and the migration destination (1304).

On the other hand, referring to FIG. 7, the license unit 702 of the storage system program "PP 2" is "computer system (divisible)". In other words, one license of the storage system program "PP 2" is applied to one computer system. In this case, one license can be applied to a plurality of storage systems 101 or the like in one computer system to which it is applied. Accordingly, regarding the storage system program "PP 2", the license migration control program 205 determines that the license can be divided to be applied to the migration source and the migration destination (1304).

If it is determined in the step 1304 that the license cannot be divided to be applied to the migration source and the migration destination, the license migration control program 205 determines that the license cannot be migrated to the migration destination (1305). In this case, a return value of the processing B is set to "NO". Then, the processing B comes to an end (1307).

On the other hand, if it is determined in the step 1304 that the license can be divided to be applied to the migration source and the migration destination, the process proceeds to the step 1306 (described above).

After all, in the example of FIG. 7, the return value is set to "NO" for the storage system program "PP 1", and to "YES" for the storage system program "PP 2".

Figure 14:
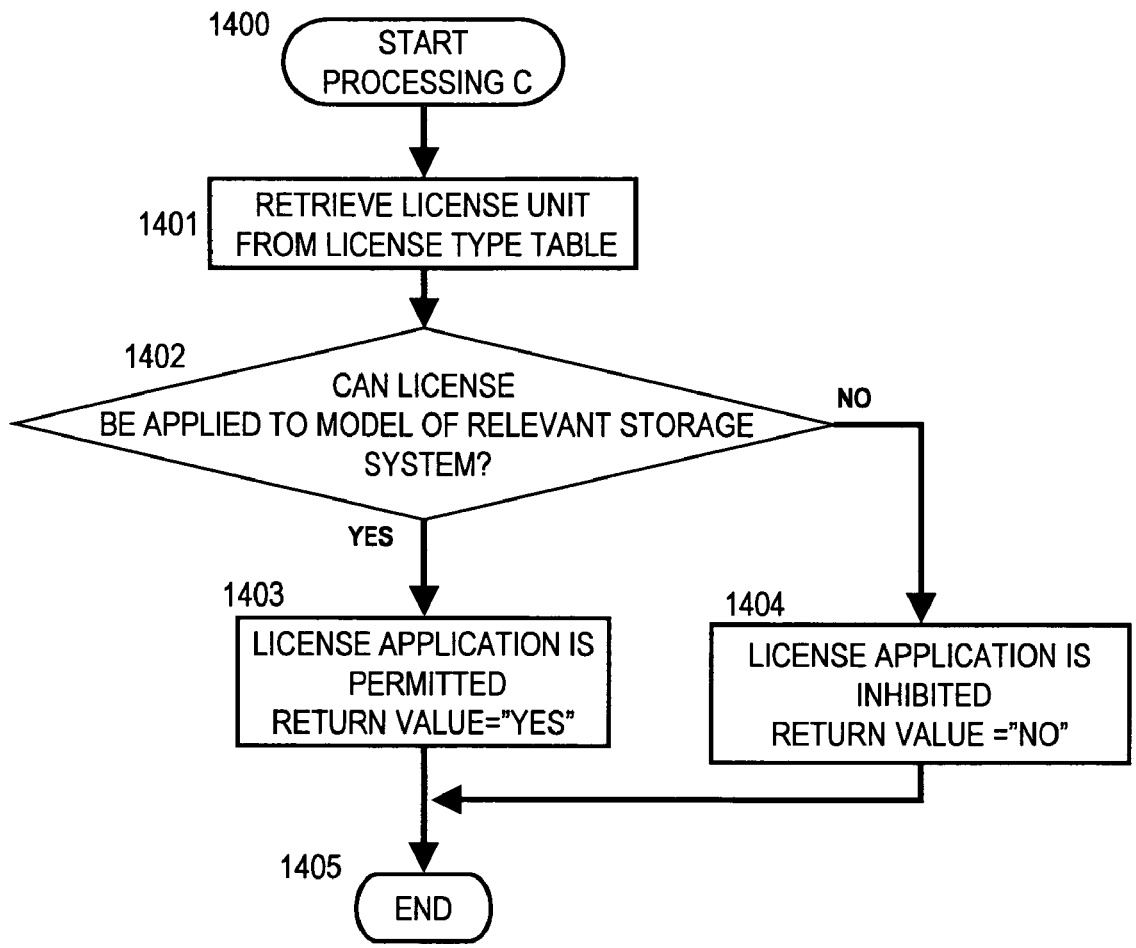
FIG. 14 is a flowchart of processing executed by the license migration control program of the first embodiment to determine whether the license can be applied or not to the migration destination.

FIG. 14 is a flowchart of the processing C executed by the license migration control program 205 according to the first embodiment.

Upon a start of the processing C in the step 1400 of FIG. 11, the license migration control program 205 refers to the license type table 211 to retrieve the license unit 702 of the storage system program 318 whose license is to be migrated (1401). In the example of FIG. 9, the storage system programs "PP 1" and "PP 2" are storage system programs 318 whose licenses are to be migrated. Accordingly, in the step 1401, the license units 702 "storage system" and "computer system (divisible)" corresponding to the "PP 1" and "PP 2" are retrieved.

Next, the license migration control program 205 determines whether the license to be migrated can be applied or not to the storage system 101 or the like of the migration destination (1402). Specifically, the license migration control program 205 refers to the model 502 of the configuration management table 209 to determine whether the license to be migrated can be applied or not to the model 502 of the storage system 101 or the like of the migration destination.

In the example of FIG. 5, the models 502 of the storage system 101 of the migration source and the storage system 102 of the migration destination are both "A".

In the example of FIG. 7, the license units 702 of the storage system programs "PP 1" and "PP 2" are respectively "storage system" and "computer system (divisible)".

As described above with reference to FIG. 7, the license unit 702 may contain information indicating the model of the storage system 101 or the like which can use the license. For example, when the license unit 702 corresponding to the "PP 1" indicates applicability to the model "A" alone, as the model 502 of the storage system 102 of the migration destination is "A", the license of the "PP 1" can be applied to the storage system 102.

When there are a plurality of licenses which can be migrated for one storage system program 318, optional one can be selected from the licenses. The selection may be made by the system administrator or the license migration control program 205. For example, a license whose unused capacity is closest to the size of the logical volume 331 of the migration destination may be selected.

If it is determined in the step 1402 that the license to be migrated can be applied to the storage system 101 or the like of the migration destination, the license migration control program 205 sets a return value of the processing C to "YES" (1403), and then the processing C comes to an end (1405).

If it is determined in the step 1402 that the license to be migrated cannot be applied to the storage system 101 or the like of the migration destination, the license migration control program 205 sets a return value of the processing C to "NO" (1404), and then the processing C comes to an end (1405).

Figure 15:
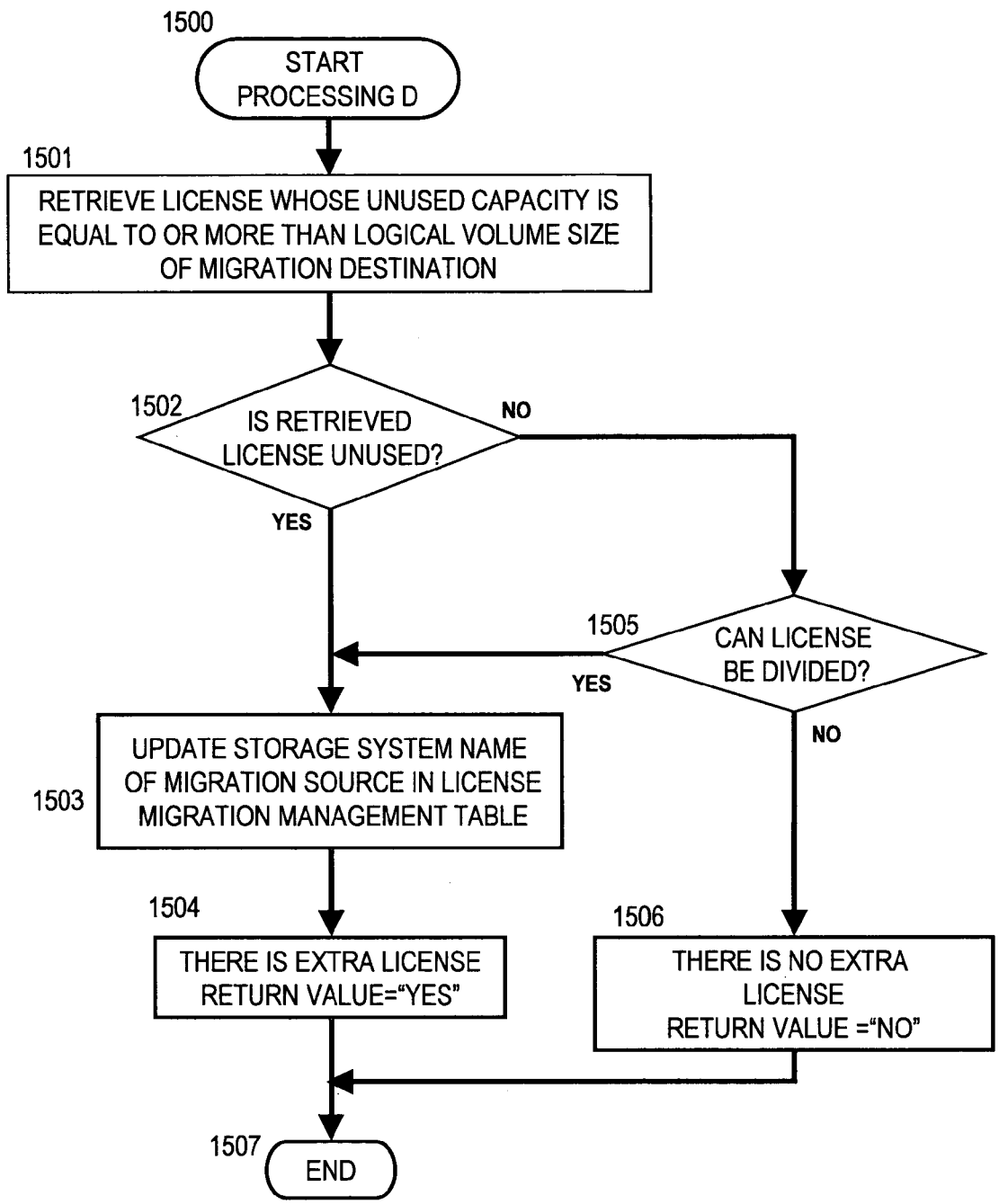
FIG. 15 is a flowchart of processing executed by the license migration control program of the first embodiment to determine whether there is an extra license or not to be applied to the migration destination.

FIG. 15 is a flowchart of the processing D executed by the license migration control program according to the first embodiment.

The processing D is for determining whether a certain storage system 101 or the likes holds an extra license to be migrated to the storage system 101 or the like of the migration destination or not when the license applied to the logical volume 331 of the migration source cannot be migrated.

Upon a start of the processing D in the step 1500 of FIG. 11, the license migration control program 205 refers to the used license table 210 to retrieve a license whose unused capacity is equal to or more than the size of the logical volume 331 of the migration destination (1501). Specifically, the migration capacity 902 of the license migration management table 212 is equal to the size of the logical volume 331 of the migration destination. Accordingly, a license key 801 whose unused capacity (difference between maximum capacity 805 and used capacity 806) is equal to or more than the migration capacity 902 is retrieved.

In the example of FIG. 9, migration capacities 902 of the storage system programs "PP 1" and "PP 2" are both 5 TB.

Referring to FIG. 8, license keys 801 corresponding to the storage system program "PP 1" are "XXXXA" and "XXXXB". An unused capacity of the license "XXXYA" is 0 TB, while an unused capacity of the license "XXXXB" is 10 TB. On the other hand, a license key 801 corresponding to the storage system program "PP 2" is "XXXXC". An unused capacity of the license "XXXXC" is 5 TB.

Thus, in the step 1501, the license "XXXXB" is retrieved for the storage system program "PP 1", and the license "XXXXC" is retrieved for the license system program "PP 2".

Next, the license migration control program 205 determines whether the license retrieved in the step 1501 is unused (i.e., not applied to any logical volume 331) or not (1502). Specifically, reference is made to the used license table 210 to determine whether an applied volume ID 804 is "unused" or not.

In the example of FIG. 8, an applied volume ID 804 of the license "XXXXB" is "unused". On the other hand, an applied volume ID 804 of the license "XXXXC" is not "unused".

If it is determined in the step 1502 that the retrieved license is "unused", the license can be migrated to the migration destination as it is an extra license not applied to any logical volume 331. Accordingly, the license migration control program 205 updates the migration source 903 of the license migration management table 212 to a value of a name of the storage system 101 or the like (i.e., applied storage system name 803) to which the license retrieved in the step 1502 is currently applied (1503).

In the example of FIG. 8, an applied storage system name 803 of the unused license "XXXXB" is "storage system 101". Accordingly, the migration source 903 of the license migration management table 212 is updated to "storage system 101". In this example, the migration source 903 before the updating is also "storage system 101". Thus, there is no change after all.

Next, the license migration control program 205 determines that there is an extra license to be applied to the migration destination (1504). In this case, a return value of the processing D is set to "YES". Then, the processing D comes to an end (1507).

On the other hand, if it is determined in the step 1502 that the retrieved license is not "unused", at least a part of the license is applied to at least one logical volume 331. In this case, the license migration control program 205 determines whether the retrieved license can be divided or not (1505). Specifically, reference is made to the license unit 702 of the license type table 211.

In the example of FIG. 8, the license unit 702 of the storage system program "PP 2" to which the license "XXXXC" is applied is "computer system (divisible)". Accordingly, the license "XXXXC" is determined to be divisible.

If it is determined in the step 1505 that the retrieved license can be divided, an unused capacity divided from the license is an extra license. In other words, the unused capacity of the license can be divided to be applied to the migration destination. In this case, the process proceeds to the step 1503. The process of the step 1503 and after is as described above, and thus description thereof will be omitted.

On the other hand, if it is determined in the step 1505 that the retrieved license cannot be divided, the unused capacity of the license cannot be applied to the migration destination. Accordingly, the license migration control program 205 determines that there is no extra license to be applied to the migration destination (1506). In this case, a return value of the processing D is set to "NO". Then, the processing D comes to an end (1507).

Figure 16:
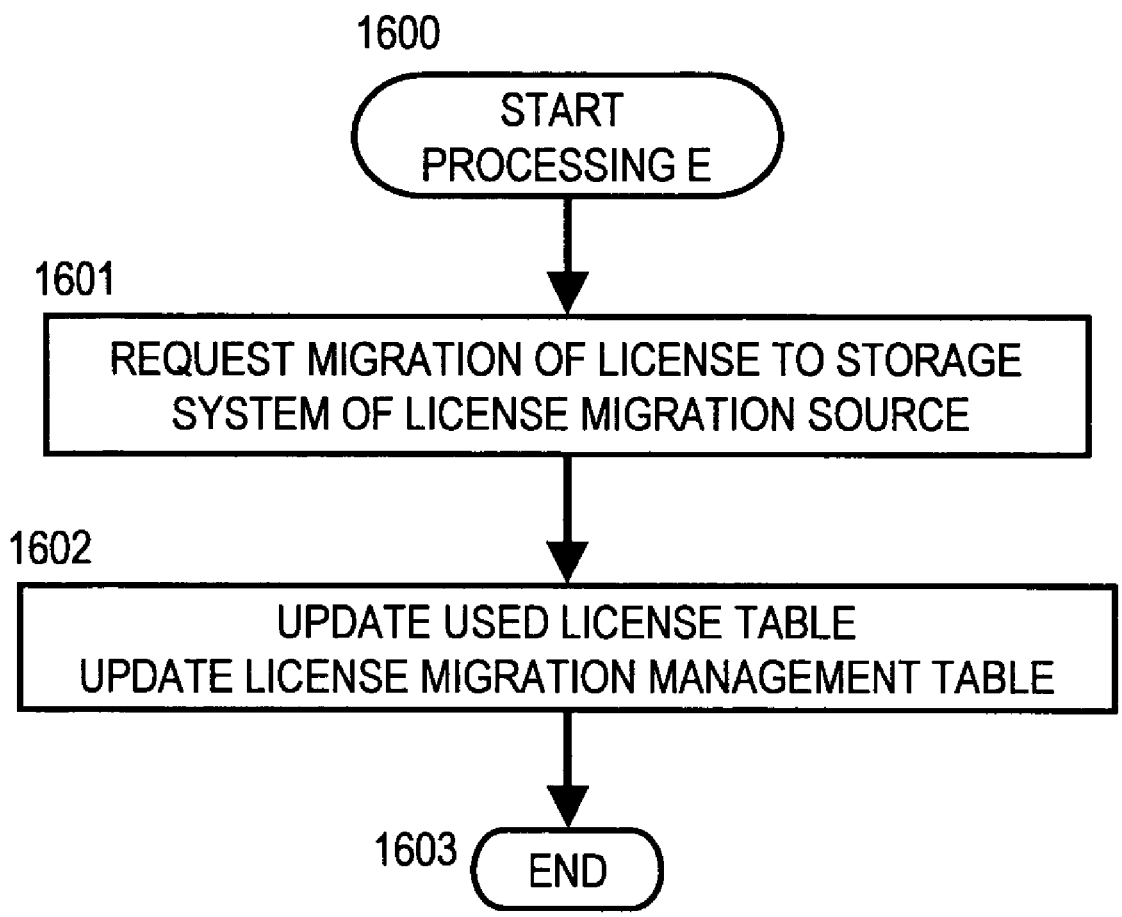
FIG. 16 is a flowchart of processing executed by the license migration control program of the first embodiment to migrate the license to the migration destination.

FIG. 16 is a flowchart of processing E executed by a license migration control program 205 according to the first embodiment.

Upon a start of the processing E in the step 1600 of FIG. 11, the license migration control program 205 refers to the license migration management table 212 to issue a license migration request to the storage systems 101 or the like of the migration source 903 and the migration destination 904 (1601). In the example of FIG. 9, a request to migrate the licenses of the storage system programs "PP 1" and "PP 2" from the storage system 101 to the storage system 102 is issued to the storage systems 101 and 102.

The storage system 101 or the like that has received the request executes the license migration program 319 to migrate the licenses. Processing shown in FIG. 17 executed by the license migration program 319 will be described in detail later.

Next, the license migration control program 205 updates the used license table 210 and the license migration management table 212 (1602).

For example, when the license migration shown in FIG. 9 is executed, in the step 1602, the applied storage system name 803 corresponding to the license "XXXXB" is updated to "storage system 102", the applied volume ID 804 is updated to "VOL 3", and the used capacity 806 is updated to "5 TB". On the other hand, "storage system 102" is added to the applied storage system name 803 corresponding to the license "XXXXC", "VOL 3" is added to the applied volume ID 804, and the used capacity 806 is updated to "20 TB". Then, each record (row) of the license migration management table 212 is deleted.

Thus, the processing E comes to an end (1603).

FIG. 17 is a flowchart of processing executed by a license migration program 319 according to the first embodiment.

Execution of the license migration program 319 of each storage system 101 or the like is started upon reception of the license migration request issued in the step 1601 of FIG. 16 (1700).

First, the license migration program 319 updates the record (line) of the license table 320, and transmits/receives the updated record (1701).

Specifically, the license migration program 319 of the storage system 101 or the like of the license migration source updates the license table 320 to match the license migration management table 212. Then, the license migration program 319 transmits the updated record of the license table 320 to the storage system 101 or the like of the license migration destination. On the other hand, the license migration program 319 of the storage system 101 or the like of the license migration destination receives the record of the license table 320 transmitted from the license migration source.

For example, when the license migrates as shown in FIG. 9, the license migration program 319 of the storage system 101 of the migration source updates an applied volume 403 corresponding to the license "XXXXB" of the license table 320 shown in FIG. 4 to "VOL 3", and updates a used capacity 405 to "5 TB". Then, the license migration program 319 of the storage system 101 transmits the updated record corresponding to the license "XXXXB" to the storage system 102 of the migration destination. The license migration program 319 of the storage system 102 receives the transmitted record.

Next, the license migration program 319 updates the license table 320 (1702). Specifically, the license migration program 319 of the storage system 101 or the like of the license migration source deletes the transmitted record from the license table 320. On the other hand, the license migration program 319 of the storage system 101 or the like of the license migration destination adds the received record to the license table 320.

For example, when the record corresponding to the license "XXXXB" is transmitted as described above, the record is deleted from the license table 320 of the storage system 101 shown in FIG. 4. On the other hand, the record is added to the license table 320 (not shown) of the storage system 102.

Next, the license migration program 319 notifies the end of the license migration processing to the management server 130 (1703).

Thus, the processing of the license migration program 319 is finished (1704).

It should be noted that the license key may be common throughout the entire computer system. Alternatively, the license migration program 319 may generate a license key matched with the storage system 101 or the like of the migration destination.

In the example of FIG. 17, the license directly migrates from the migration source to the migration destination. However, the license may first migrate to the management server 130 or a specific storage system 101 or the like, and then migrate from the management server 130 or the like to the migration destination.

Figure 18:
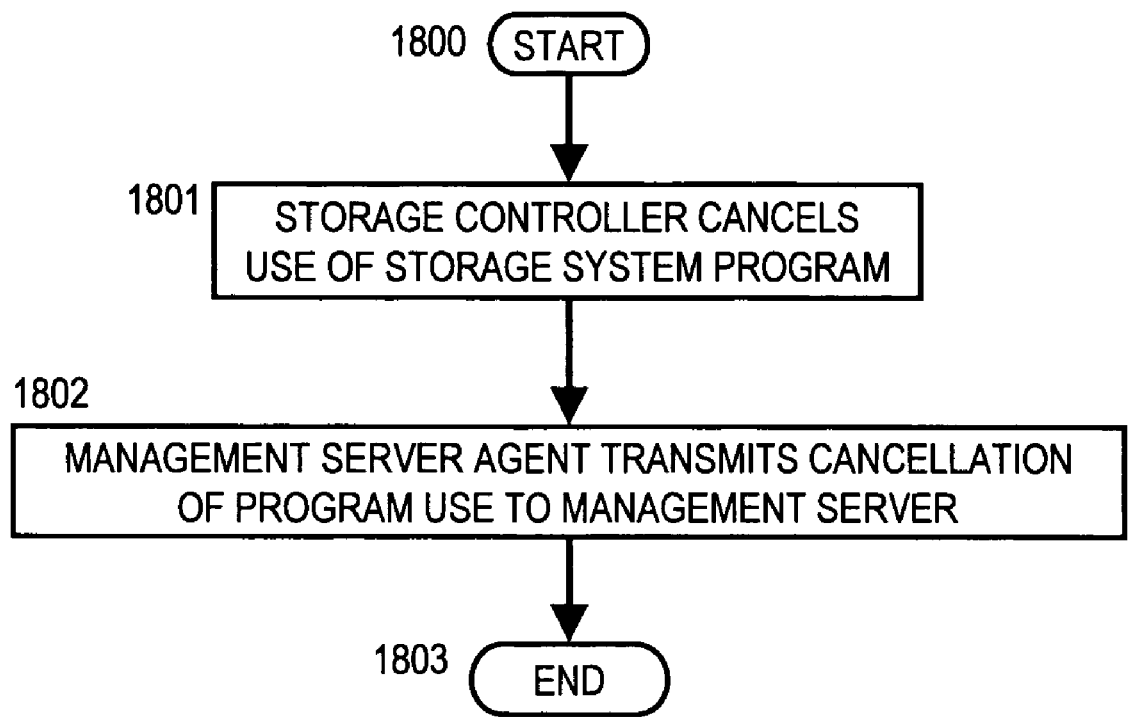
FIG. 18 is a flowchart of processing executed when use of the storage system program is canceled in the storage system of the first embodiment.

FIG. 18 is a flowchart of processing executed when use of the storage system program 318 is canceled in the storage system 101 or the like of the first embodiment.

This processing is executed when the storage system program 318 used at a certain storage system 101 or the like is not used any more (i.e. use is canceled) because of the execution of a data migration.

When this processing is started (1800), and the storage controller 310 of the storage system 101 or the like cancels use of a certain storage system program 318 (1801), the management server agent 316 transmits a notice of the canceled use of the storage system program 318 to the management server 130 (1802). Processing executed by the management server 130 which receives the notice shown in FIG. 19 will be described in detail later.

Each storage system 101 or the like comprises a storage system management program (not shown) for monitoring an usage status of the storage system program 318 and detecting cancellation of the use.

Thus, the processing comes to an end (1803).

Figure 19:
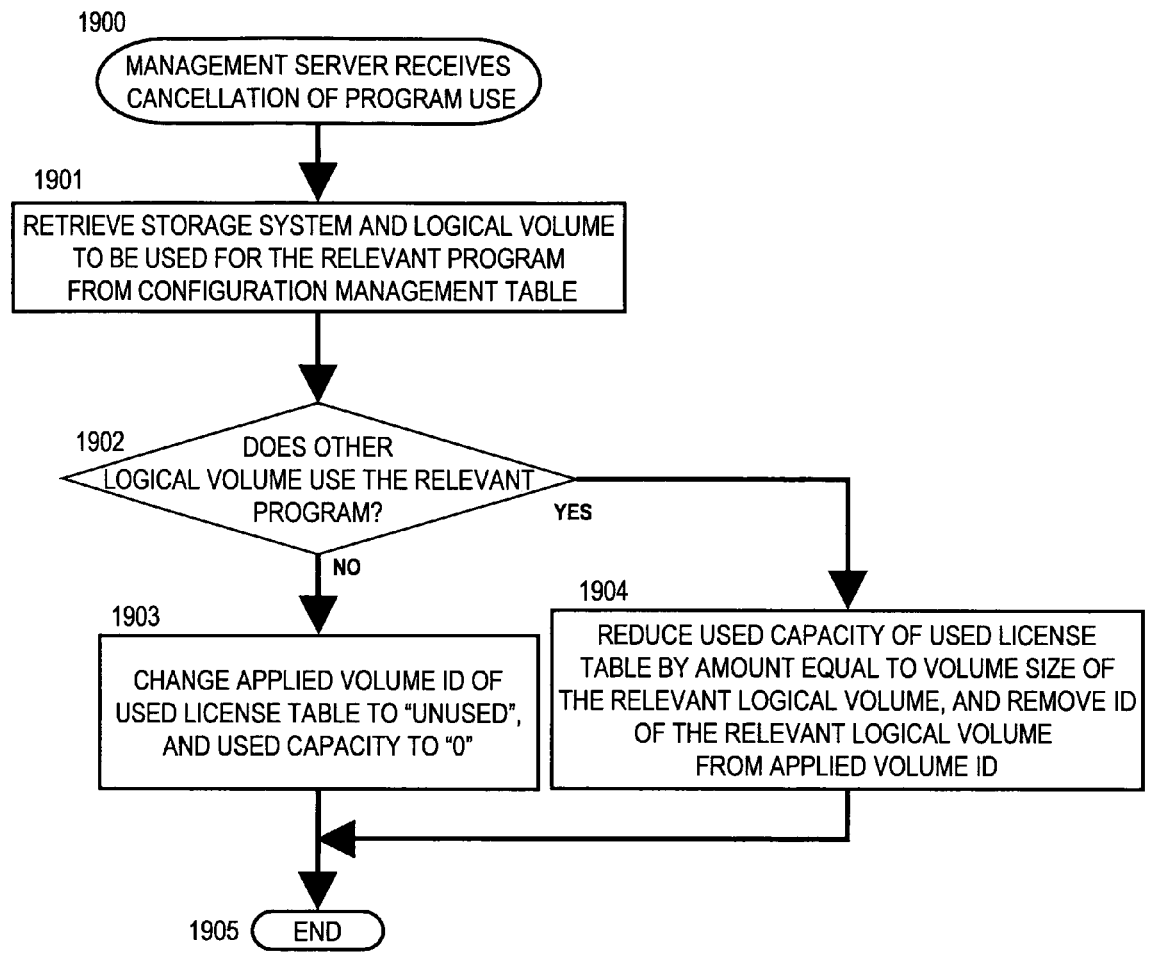
FIG. 19 is a flowchart of processing executed by the license migration control program when the use of the storage system program is canceled in the storage system of the first embodiment.

FIG. 19 is a flowchart of processing executed by the license migration control program 205 when use of the storage system program 318 is canceled in the storage system 101 or the like of the first embodiment.

The processing of FIG. 19 is for causing the license migration control program 205 to update the used license table 210 when the management server 130 receives the notice (notice of canceled use of the storage system program 318 at a certain logical volume 331) transmitted from the storage system 101 or the like in the step 1802 of FIG. 18.

In the description of FIG. 19, the storage system program 318 of the canceled use is written as "the relevant storage system program 318", and the logical volume 331 for which use of the storage system program 318 is canceled is written as "the relevant logical volume 331".

When the management server 130 receives the notice and this processing is started (1900), the license migration control program 205 retrieves the storage system 101 or the like, and the logical volume 331 which use (or have used) the relevant storage system program 318 (1901).

Specifically, the license migration control program 205 refers to the configuration management table 209 to retrieve a storage system name 501 and a logical volume ID 503 which contain the relevant storage system program 318 in a used program name 505.

Next, the license migration control program 205 determines whether there is a logical volume 331 which uses the relevant storage system program 318 or not in addition to the relevant logical volume 331 (1902).

If it is determined in the step 1902 that there is no logical volume 331 which uses the relevant storage system program 318 in addition to the relevant logical volume 331, a license applied to the relevant storage system program 318 becomes unused at this point of time. Accordingly, the license migration control program 205 updates an applied volume ID 804 corresponding to the license applied to the relevant storage system program 318 of the used license table 210 to "unused", and updates a used capacity 806 to "0 (TB)" (1903).

On the other hand, if it is determined in the step 1902 that there is a logical volume 318 which uses the relevant storage system program 318 in addition to the relevant logical volume 331, the license applied to the relevant storage system program 318 is applied to the other logical volume 331 at this point of time. In this case, the license migration control program 205 deletes the logical volume ID of the relevant logical volume 331 from an applied volume ID 804 corresponding to the license applied to the relevant storage system program 318 of the used license table 210, and subtracts the capacity of the relevant logical volume 331 from a used capacity 806 (1904).

For example, when the configuration management table 209 is as shown in FIG. 5, and the use of the relevant storage system program "PP 1" is canceled for the relevant logical volume "VOL 1" of the storage system 101, in the step 1901, "storage system 101" is retrieved as a storage system name 501, and "VOL 1" and "VOL 2" are retrieved as logical volume ID's 503.

In this case, it is determined in the step 1902 that the relevant storage system program "PP 1" is used for the logical volume "VOL 2" in addition to the relevant logical volume "VOL 1".

Next, in the step 1904, the logical volume "VOL 1" is deleted from the applied volume ID 804 corresponding to the license "XXXXA". Further, a value of the used capacity 806 is updated to "5 TB" obtained by subtracting a size "10 TB" of the relevant logical volume "VOL 1" (see logical volume size 504 of the configuration management table 209 shown in FIG. 5) from "15 TB".

Thus, the processing of FIG. 19 comes to an end (1905).

In the examples of FIGS. 18 and 19, the management server agent 316 of the storage system 101 or the like transmits the notice of the canceled use of the storage system program 318 to the management server 130. However, for example, the management server 130 may periodically execute polling to find the storage system program 318 used by each storage system 101 or the like. Alternatively, the management server agent 316 may periodically notify the usage status of the storage system program 318 to the management server 130.

In the examples of FIGS. 18 and 19, the license unused as a result of the canceled use remains held by the storage system 101 or the like. However, the unused license may be held by those other than the storage system 101 or the like. For example, the management server 130 or a specific storage system 101 or the like may comprise a function of managing an extra license, and the storage system 101 or the like may return the unused license to this management server 130 or specific storage system 101 or the like. In this case, when the license needs to be migrated, the management server 130 or the like allocates the license.

This embodiment has been described by way of example where the data migration shown in FIG. 6 is executed. In this case, the migration source of the data and the migration source of the license are both storage systems 101 shown in FIG. 9. However, the migration source of the data and the migration source of the license may be different.

For example, in the used license table 210 of FIG. 8, when the applied storage system name 803 of the unused license "XXXXB" regarding the storage system program "PP 1" is "storage system 103", the license "XXXXB" must be migrated from the storage system 103 to the storage system 102.

In this case, whether there is a path set or not between the storage systems 103 and 102 is a problem. It is because the license cannot be migrated if there is no path set therebetween.

In this case, the license migration control program 205 determines whether the license can be migrated or not. Specifically, reference is made to a path 506 of the configuration management table 209 to determine whether there is a path set or not between the storage systems 101 or the like of the license migration source and destination. This determination is executed when a return value of the processing D is "YES" in a step 1103 (not shown).

When the license "XXXXB" is migrated from the storage system 103 to the storage system 102, reference is made to the path 506 of the storage system 103. In the example of FIG. 5, paths 506 of the storage system 103 are "101" and "102". This means that there is a path set from the storage system 103 to the storage system 102 (similarly, there is a path set from the storage system 103 to the storage system 101). In this case, the license can be migrated from the storage system 103 to the storage system 102. Accordingly, migration is executed.

Alternatively, even when there is no direct path, the license may be migrated via the other storage system 101 or the like. For example, referring to FIG. 5, when a path 506 of the storage system 103 is only "101", there is no direct path set from the storage system 103 to the storage system 102. However, there are paths set from the storage system 103 to the storage system 101 and from the storage system 101 to the storage system 102. Thus, the license migration control program 205 can migrate the license "XXXXB" from the storage system 103 via the storage system 101 to the storage system 102.

When there are a plurality of paths to migrate the license, an optional path can be selected. For example, an optimal path may be decided to minimize the number of storage systems 101 or the like to be passed through.

Alternatively, the management server 130 may migrate the license via itself (or another device in the computer system).

When there are determined no paths to migrate the license to the migration destination, the license migration control program 205 inhibits migration of the license and retrieve another unused license. Alternatively, presence of an unused license but nonpresence of a path, to migrate the license may be notified to the system administrator.

In the aforementioned case, the storage systems 101 or the like may be present in different data centers.

The description of this embodiment has been directed for the case of the license migration when the data is migrated. However, this embodiment can be applied to a license migration when data is subjected to remote copy. The remote copy is a technology of transferring, to prevent a data loss at the time of a system trouble or a disaster, data of the storage system to that of a remote place to create a copy of the data.

Specifically, when remote copy is executed, data of a logical volume 331 of a copy source (transfer source) is transferred to that of a copy destination (transfer destination) to be stored.

Different from the case of the migration, even after the remote copy is executed, the copied data is left in the logical volume 331 of the storage system 101 or the like of the copy source. Accordingly, even when a license is necessary at the copy destination, a license of the copy source cannot be migrated to the copy destination.

Hereinafter, a license migration when data is subjected to remote copy will be described.

Figure 20:
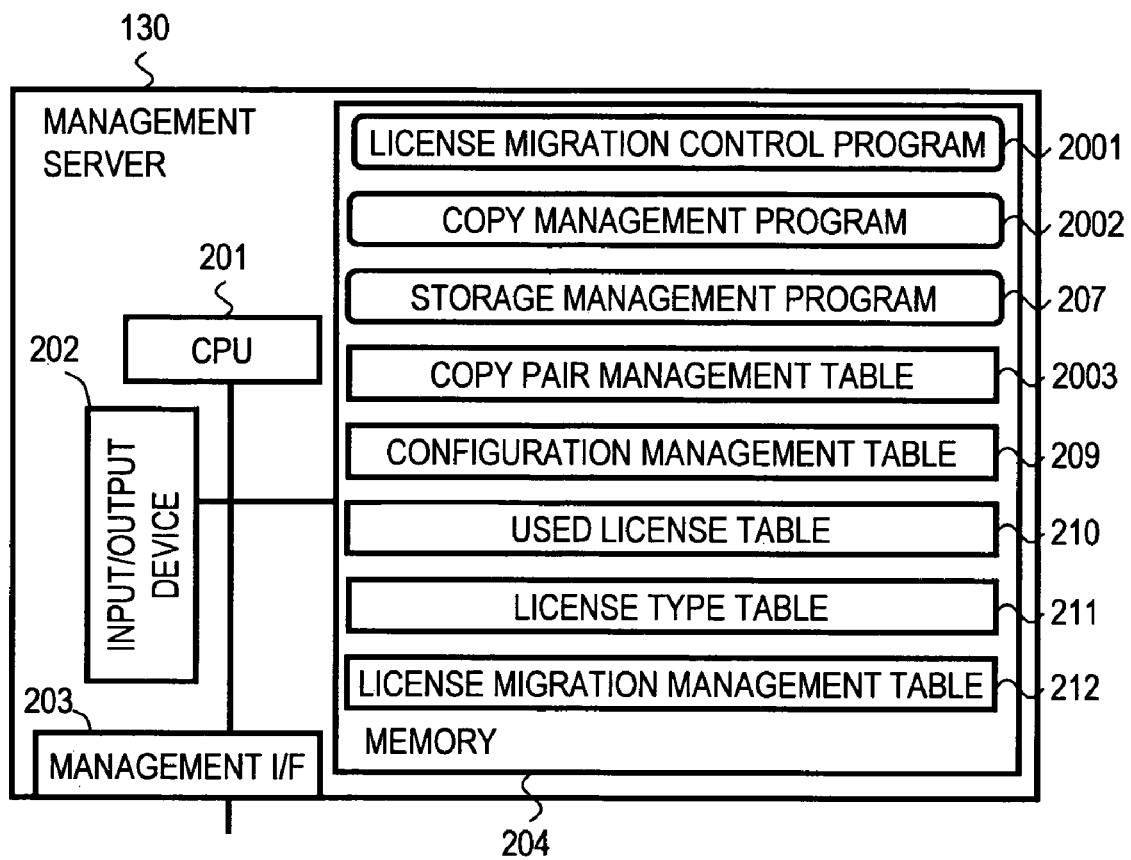
FIG. 20 is a block diagram showing a configuration of the management server when remote copy is executed according to the first embodiment.

FIG. 20 is a block diagram showing a configuration of the management server 130 when remote copy is executed according to the first embodiment.

The management server 130 of FIG. 20 comprises a license migration control program 2001, a copy management program 2002 and a copy pair management table 2003 which replace the license migration control program 205, the migration management program 206, and the migration management table 208 of the management server 130 of FIG. 2. The programs and table shown in FIGS. 22 to 24 will be described in detail later. Other portions of the management server 130 of FIG. 20 are similar to those of the management server 130 of FIG. 2, and thus description thereof will be omitted.

Figure 21:
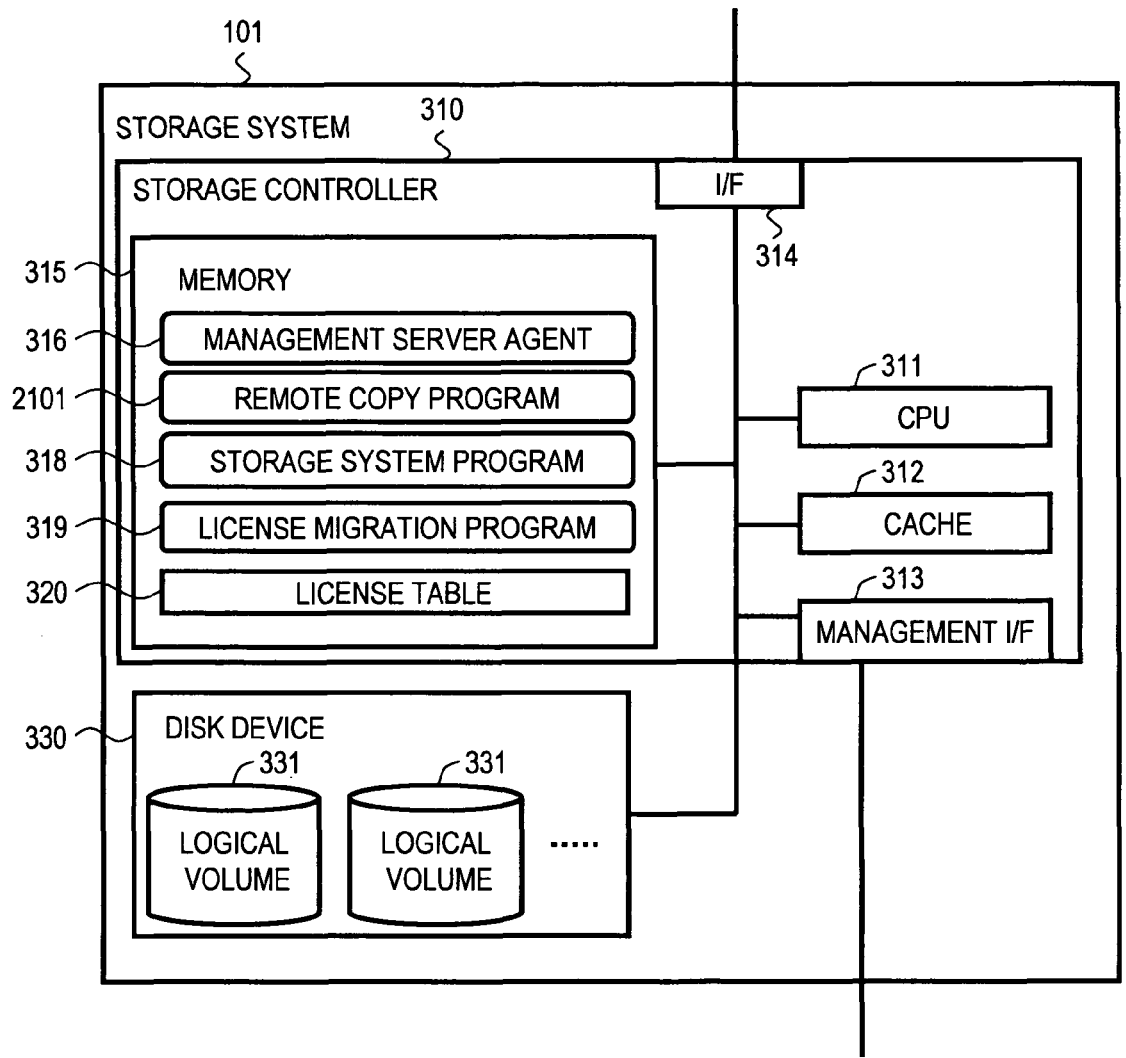
FIG. 21 is a block diagram showing a configuration of the storage system when the remote copy is executed according to the first embodiment.

FIG. 21 is a block diagram showing a configuration of the storage system 101 when remote copy is executed according to the first embodiment.

Configurations of storage systems 102 and 103 are similar to that of the storage system 101, and thus description thereof will be omitted.

The storage system 101 of FIG. 21 comprises a remote copy program 2101 which replaces the migration program 317 between the nodes of the storage system 101 of FIG. 3.

The remote copy program 2101 is for copying (remote-copy) data of a logical volume 331 of the storage system 101 to a logical volume 331 of the other storage system 102 or the like.

Other portions of the storage system 101 of FIG. 21 are similar to those of the storage system 101 of FIG. 3, and thus description thereof will be omitted.

FIG. 22 is an explanatory diagram of the copy pair management table 2003 of the first embodiment.

In the copy pair management table 2003, for remote-copy scheduled to be executed, information regarding the logical volumes 331 of the copy source and copy destination is registered by the copy management program 2002.

In the copy pair management table 2003, a storage system name 2211 and a logical volume ID 2212 of the copy source are registered in a copy source 2210. On the other hand, a storage system name 2221 and a logical volume ID 2222 of the copy destination are registered in a copy destination 2220.

In the example of FIG. 22, "storage system 101" and "VOL 2" are respectively registered as a storage system name 2211 and a logical volume ID 2212 of the copy source 2210. On the other hand, "storage system 102" and "VOL 3" are respectively registered as a storage system name 2221 and a logical volume ID 2222 of the copy destination 2220. This means that remote-coping is scheduled to be executed from the logical volume "VOL 2" of the storage system 101 to the logical volume "VOL 3" of the storage system 102.

Figure 23:
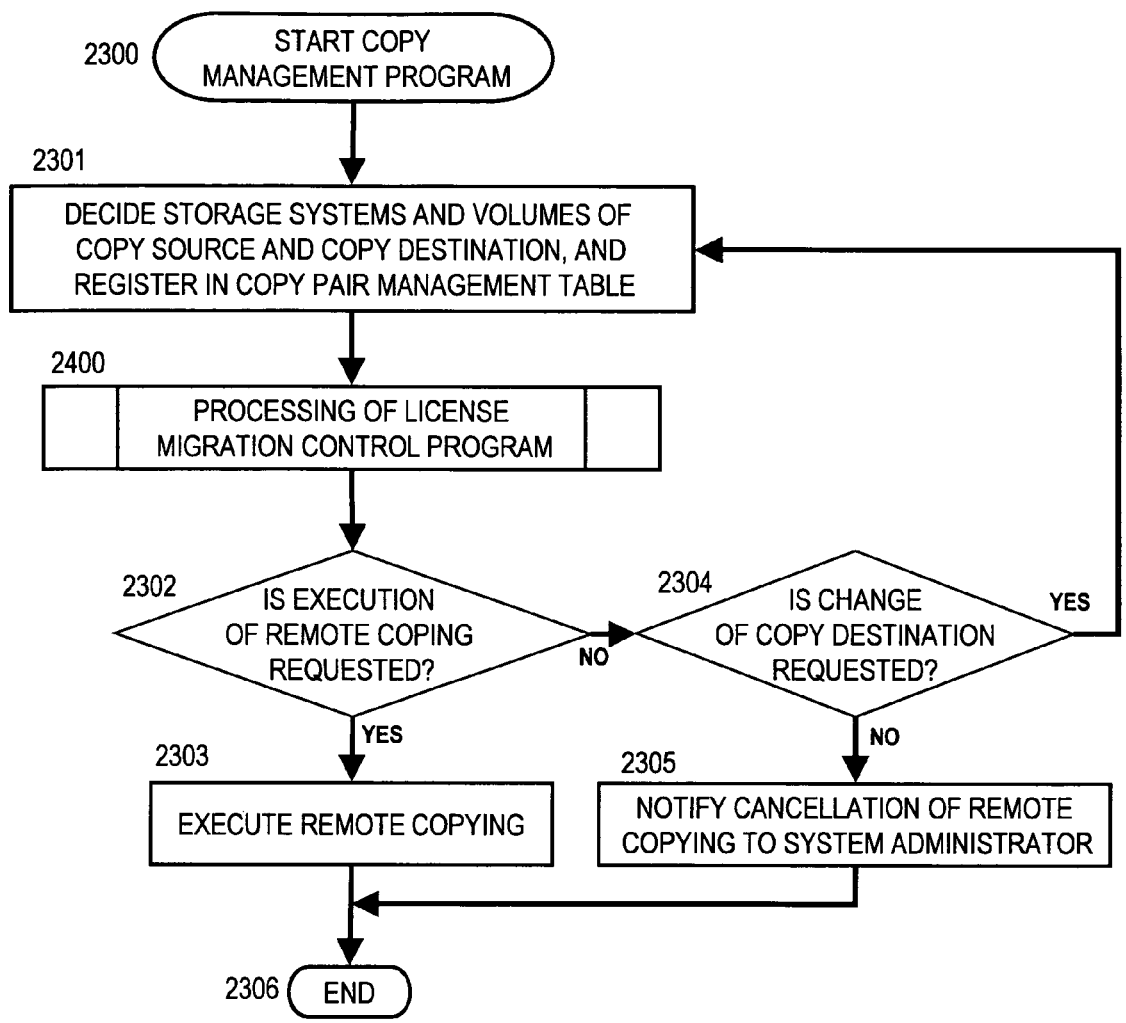
FIG. 23 is a flowchart of processing executed by a copy management program of the first embodiment.

FIG. 23 is a flowchart of processing executed by the copy management program 2002 of the first embodiment.

The copy management program 2002 is executed when a copy pair is created and remote-copy is executed based on the copy pair. The copy pair is a set of logical volumes 331 of the copy source and copy destination.

Upon a start of the processing (2300), the copy management program 2002 decides storage systems 101 or the like and logical volumes 331 of copy source and copy destination, and registers pieces of information thereof in the copy pair management table 2003 (2301).

Next, the copy pair program 2002 calls the license migration control program 2001 to execute processing (2400). The processing executed here will be described in detail later shown in FIG. 24.

Next, the copy management program 2002 determines whether execution of remote-copy is requested or not as a result of the processing of the license migration control program 2001 (2302).

If it is determined in the step 2302 that the execution of remote-copy is requested, remote-copy according to the copy pair management table 2003 can be executed. Accordingly, the copy management program 2002 executes remote-copy according to the contents registered in the copy pair management table 2003 (2303), and the processing comes to an end (2306).

On the other hand, if it is determined in the step 2302 that the execution of remote-copy is not requested, remote-copy according to the copy pair management table 2003 cannot be executed. In this case, the copy management program 2002 determines whether a change of the copy destination 2220 is requested or not as a result of the processing of the license migration control program 2001 (2304).

Figure 24:
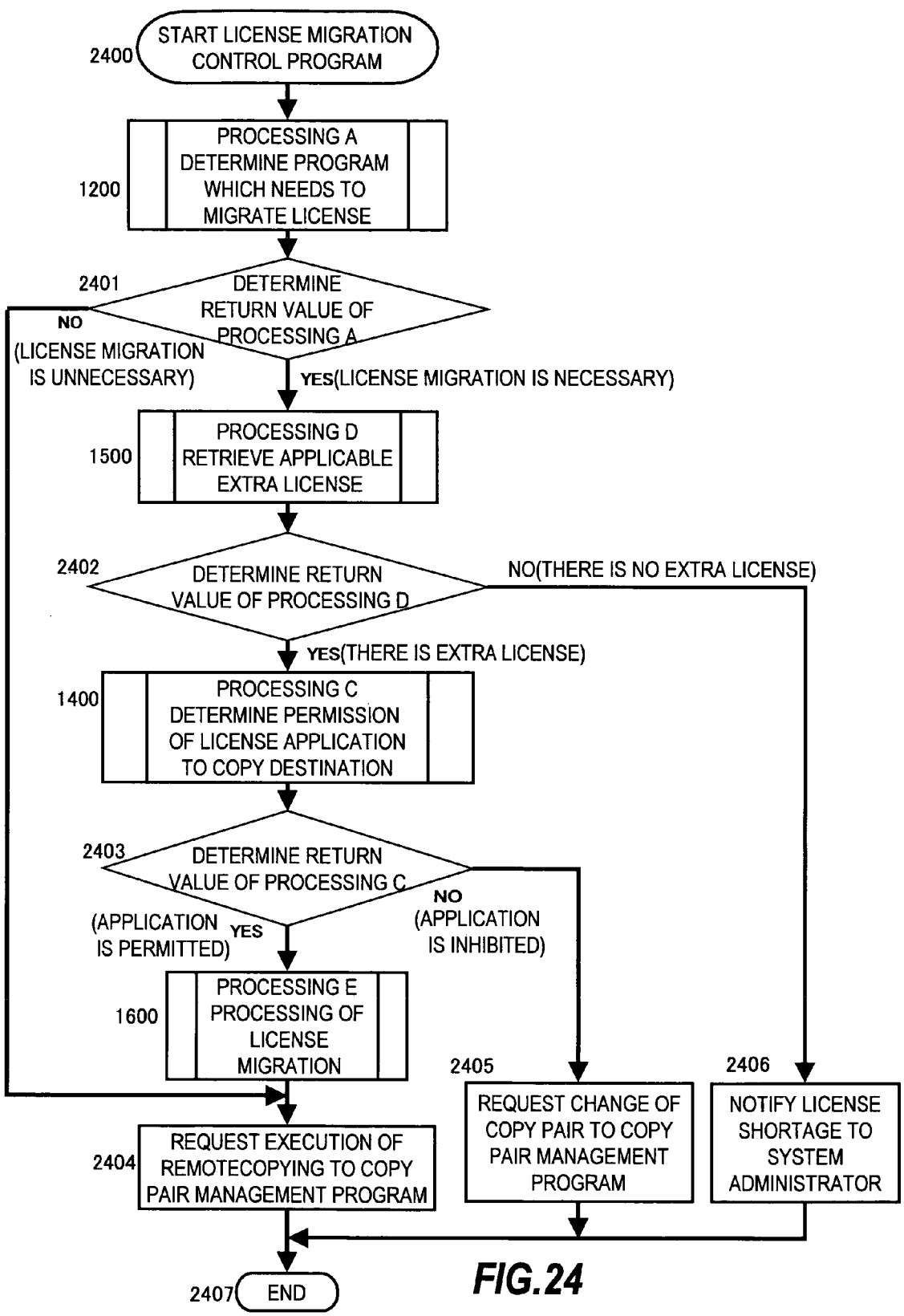
FIG. 24 is a flowchart of processing executed by the license migration control program when the remote copy is executed according to the first embodiment.

If it is determined in the step 2304 that the change of the copy destination 2220 is not requested, remote-copy cannot be executed because of a license shortage shown in FIG. 24. Accordingly, the copy management program 2002 transmits a notice of remote copy cancellation to the system administrator (2305), and finishes the processing without executing remote-copy (2306).

On the other hand, if it is determined in the step 2304 that the change of the copy destination 2220 is requested, a license cannot be migrated to the decided copy destination 2220 while there are enough licenses shown in FIG. 24. In other words, the license may be migrated by changing the copy destination 2220. Thus, the copy management program 2002 returns to the step 2301 to decide a copy destination 2220 again according to the request, and registers the copy destination 2220 in the copy pair management table 2003 (23012). Subsequently, a process of a step 2400 and after will be executed.

FIG. 24 is a flowchart of processing executed by the license migration control program 2001 when remote-copy is executed according to the first embodiment.

The processing of the license migration control program 2001 is started when it is called by the copy management program 2002 in the step 2400 of FIG. 23.

Description of a portion of the processing of the license migration control program 2001 similar to that of the license migration control program 205 will be omitted.

Upon a start of the processing (2400), the license migration control program 2001 executes processing A (1200). Contents of the processing A are as described above with reference to FIG. 12. However, in the processing A of FIG. 12, "license migration control program 205", "migration management table 208", "migration", "migration source", and "migration destination" are respectively equivalent to "license migration control program 2001", "copy pair management table 2003", "remote copy", "copy source", and "copy destination". This is similar in the cases of processing C, processing D and processing E described below. By the processing A, a storage system program 318 which needs to migrate a license to a logical volume 331 of the copy destination is determined.

Next, the license migration control program 2001 determines a return value of the processing A (2401).

If it is determined in the step 2401 that a return value of the processing A is "NO", it is not necessary to migrate a license of any storage system program 318. In other words, remote copy can be executed without migrating a license. Thus, the license migration control program 2001 proceeds to a step 2404 (described later).

On the other hand, if it is determined in the step 2401 that the return value of the processing A is "YES", it is necessary to migrate a license of at least one of the storage system programs 318. However, when remote-copy is executed, data is left in the primary storage system 101 or the like, and thus a license of the copy source cannot be migrated to the copy destination. Thus, the license migration control program 2001 executes processing D shown in FIG. 15 to determine whether there is an extra license or not to be applied to a logical volume 331 of the copy destination (1500).

Next, the license migration control program 2001 determines a return value of the processing D (2402).

If the return value of the processing D is determined to be "NO" in the step 2402, there is no extra license to be applied to the logical volume 331 of a copy destination. In this case, there is a shortage of licenses to be applied to the copy destination. Thus, the license migration control program 2001 notifies the license shortage to the system administrator (2406) and finishes the processing (2407).

On the other hand, if the return value of the processing D is determined to be "YES" in the step 2402, there is an extra license to be applied to the logical volume 331 of the copy destination. In this case, the license migration control program 2001 executes the processing C (1400). The processing C determines whether or not the necessary license can be applied to the logical volume 331 of the storage system 101 or the like of the copy destination shown in FIG. 14.

The license migration control program 2001 executes the processing C, and then determines a return value for the processing C (2403).

If the return value of the processing C is determined to be "NO" in the step 2403, the necessary license cannot be applied to the logical volume 331 of the copy destination. In this case, there is not exactly a shortage of necessary licenses. Thus, by changing the copy destination, a remote copy may be executed. Accordingly, the license migration control program 2001 requests a change of the copy pairs to the copy management program 2002 (2405) to finish the processing (2407).

If the return value of the processing C is determined to be "YES" in the step 2403, a necessary license can be applied to the logical volume 331 of the copy destination. In this case, the license migration control program 2001 executes the processing E (1600). The processing E is for migrating a license shown in FIG. 16.

Next, the license migration control program 2001 requests execution of migration to the migration management program 206 (2404), and finishes the processing (2407).

According to this embodiment, before the execution of data migration or remote-copy, determination is made as to a need to apply the license of the storage system program to the storage system of the migration destination or the copy destination. Then, when the license must be applied, determination is made as to whether a necessary license can be migrated or not.

If the license can be migrated and the license migration provides enough licenses, use of the storage system program can be continued without purchasing a new license.

Only if the license cannot be migrated, or only if there is still a shortage of licenses even when the license is migrated, only a new license needs to be purchased. Thus, running costs of the storage system are reduced.

Next, a second embodiment will be described.

In the description below, differences of this embodiment from the first embodiment will be explained, but explanation of portions similar to those of the first embodiment will be omitted.

Figure 25:
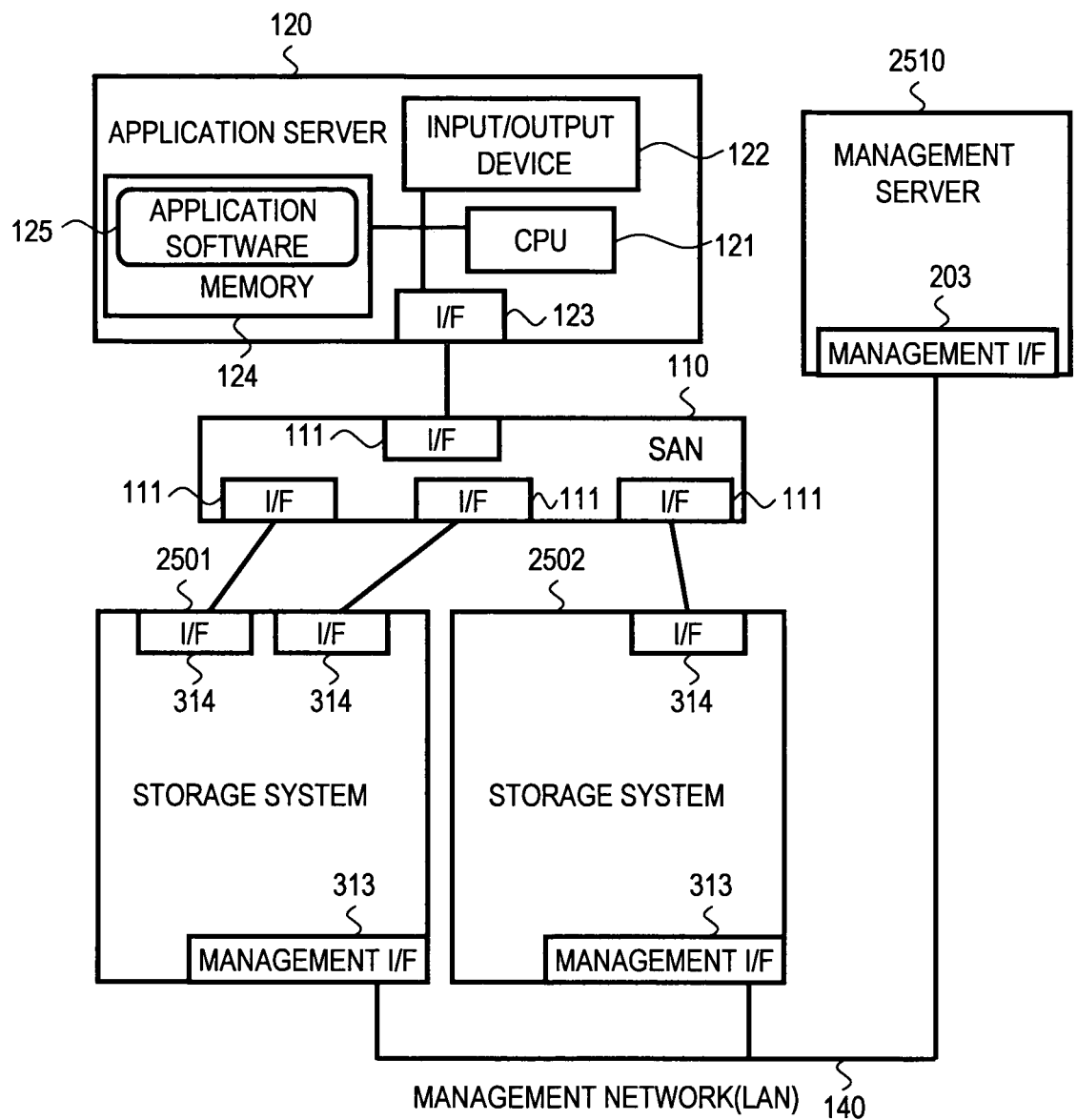
FIG. 25 is a block diagram showing a configuration of a computer system according to a second embodiment.

FIG. 25 is a block diagram showing a configuration of a computer system according to the second embodiment.

The computer system of this embodiment comprises storage systems 2501 and 2502, a SAN 110, an application server 120, a management server 2510, and a management network 140.

The storage systems 2501 and 2502 and the management server 2510 shown in FIGS. 26 to 28 will be described in detail later.

As described later, the storage system 2502 of this embodiment is externally connected to the storage system 2501.

Figure 26:
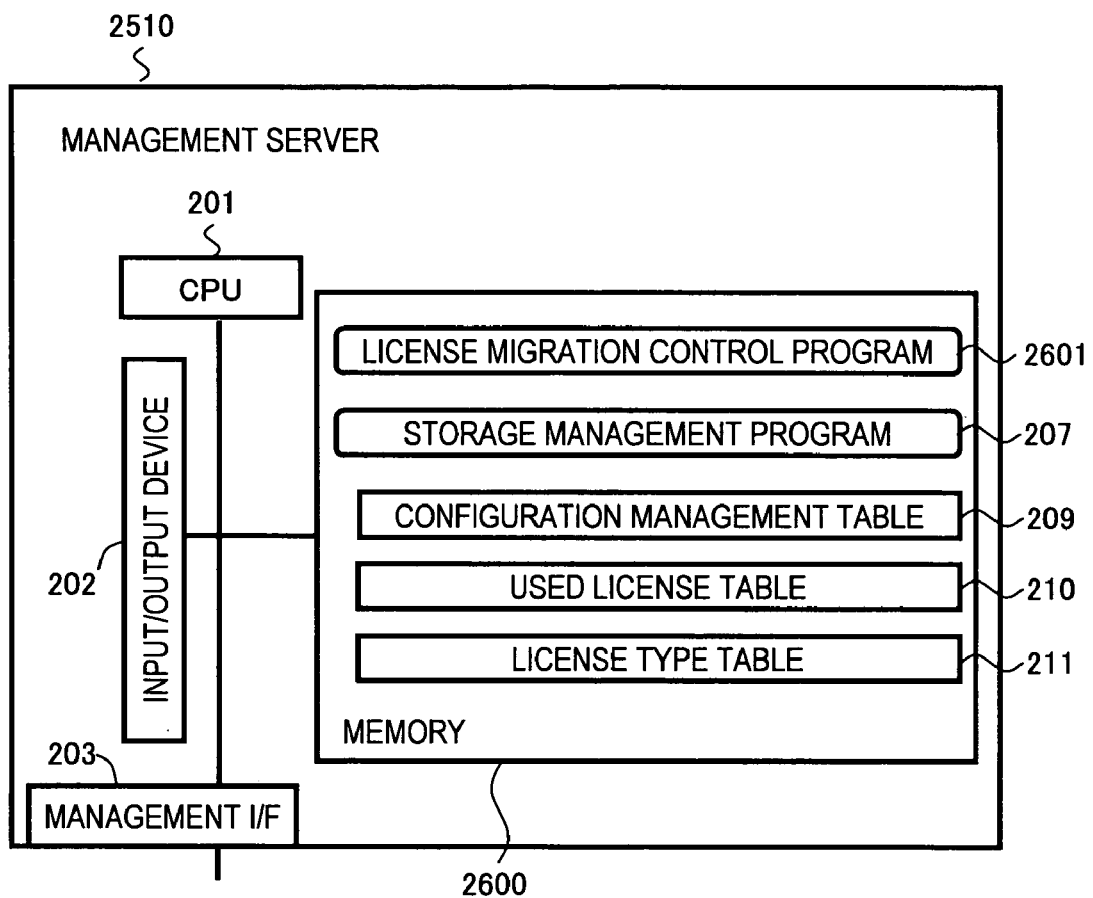
FIG. 26 is a block diagram showing a configuration of a management server according to the second embodiment.

FIG. 26 is a block diagram showing a configuration of the management server 2510 of the second embodiment.

The management server 2510 of this embodiment comprises a CPU 201, an input/output device 202, a management I/F 203, and a memory 2600.

The memory 2600 is, for example, a semiconductor memory. The memory 2600 of this embodiment stores at least a license migration control program 2601, a storage management program 207, a configuration management table 209, a used license table 210, and a license type table 211. Processing executed by the license migration control program 2601 in FIG. 31 will be described in detail later.

Figure 27:
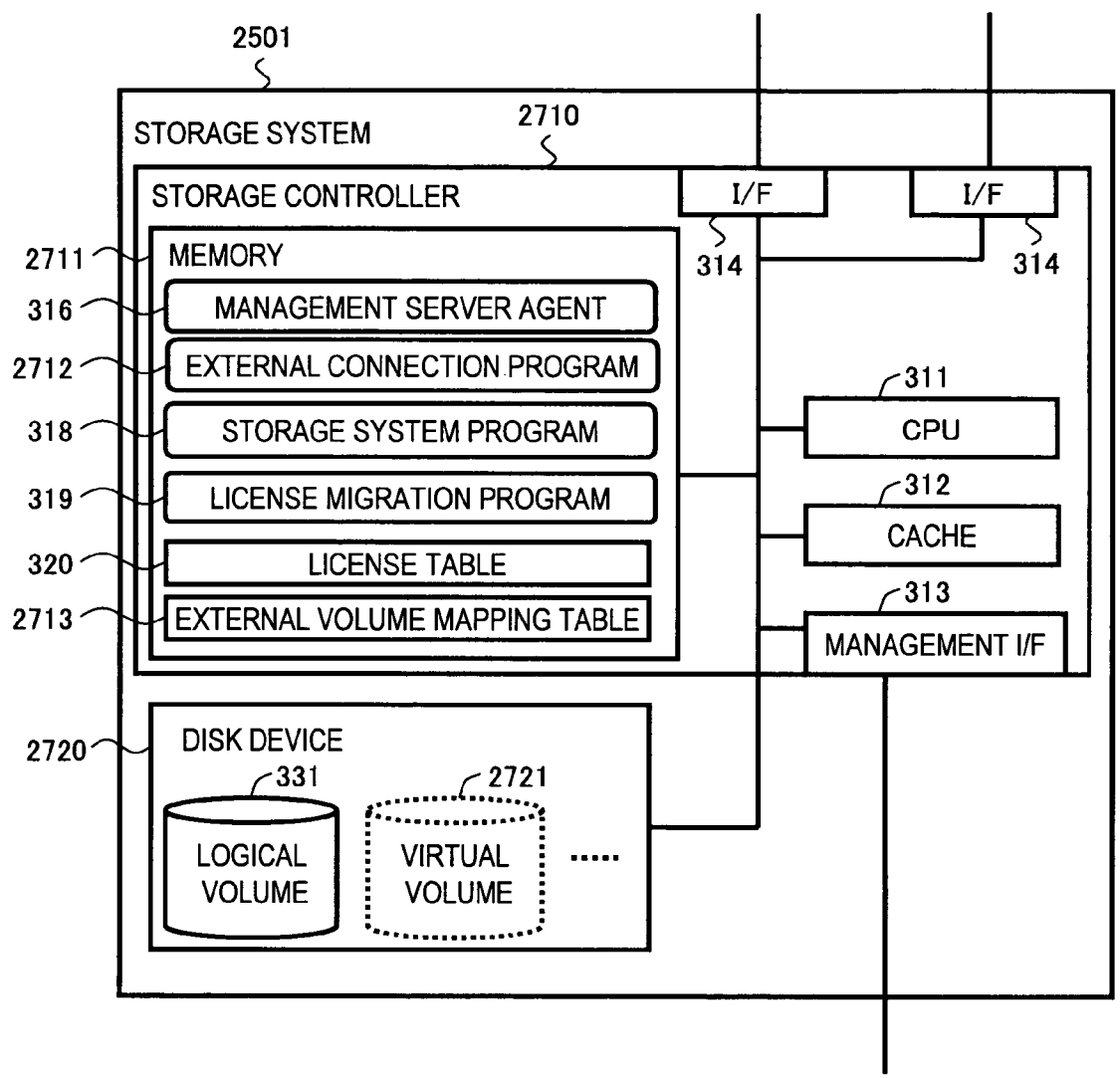
FIG. 27 is a block diagram showing a configuration of a storage system according to the second embodiment.

FIG. 27 is a block diagram showing a configuration of the storage system 2501 of the second embodiment.

The storage system 2501 of this embodiment comprises a disk device 2720 and a storage controller 2710.

The disk device 2720 stores data written from the application server 120. The disk device 2720 comprises one or more disk drives (not shown). A storage area of the disk device 2720 is divided into one or more logical volumes 331. Further, the disk device 2720 includes one or more virtual volumes 2721. The virtual volume 2721 is a virtual logical volume 331. The storage controller 2710 causes the management server 2510 to recognize the logical volume 331 of the externally connected storage system 2502 as a virtual volume 2721 as if it were present in the disk device 2720. In other words, the virtual volume 2721 is not actually present in the disk device 2720. Thus, in reality, the disk device 2720 is similar to the disk device 330 of the first embodiment.

The storage controller 2710 comprises a CPU 311, a cache 312, a management I/F 313, two I/F's 314, and a memory 2711.

One of the two I/F's 314 communicates with the application server 120 via the SAN 110, while the other communicates with the externally connected storage system 2502 via the SAN 110.

The memory 2711 is, for example, a semiconductor memory. The memory 2711 of this embodiment stores at least a management server agent 316, an external connection program 2712, a storage system program 318, a license migration program 319, a license table 320, and an external volume mapping table 2713. The external connection program 2712 and the external volume mapping table 2713 shown in FIGS. 29 and 30 will be described in detail later.

Figure 28:
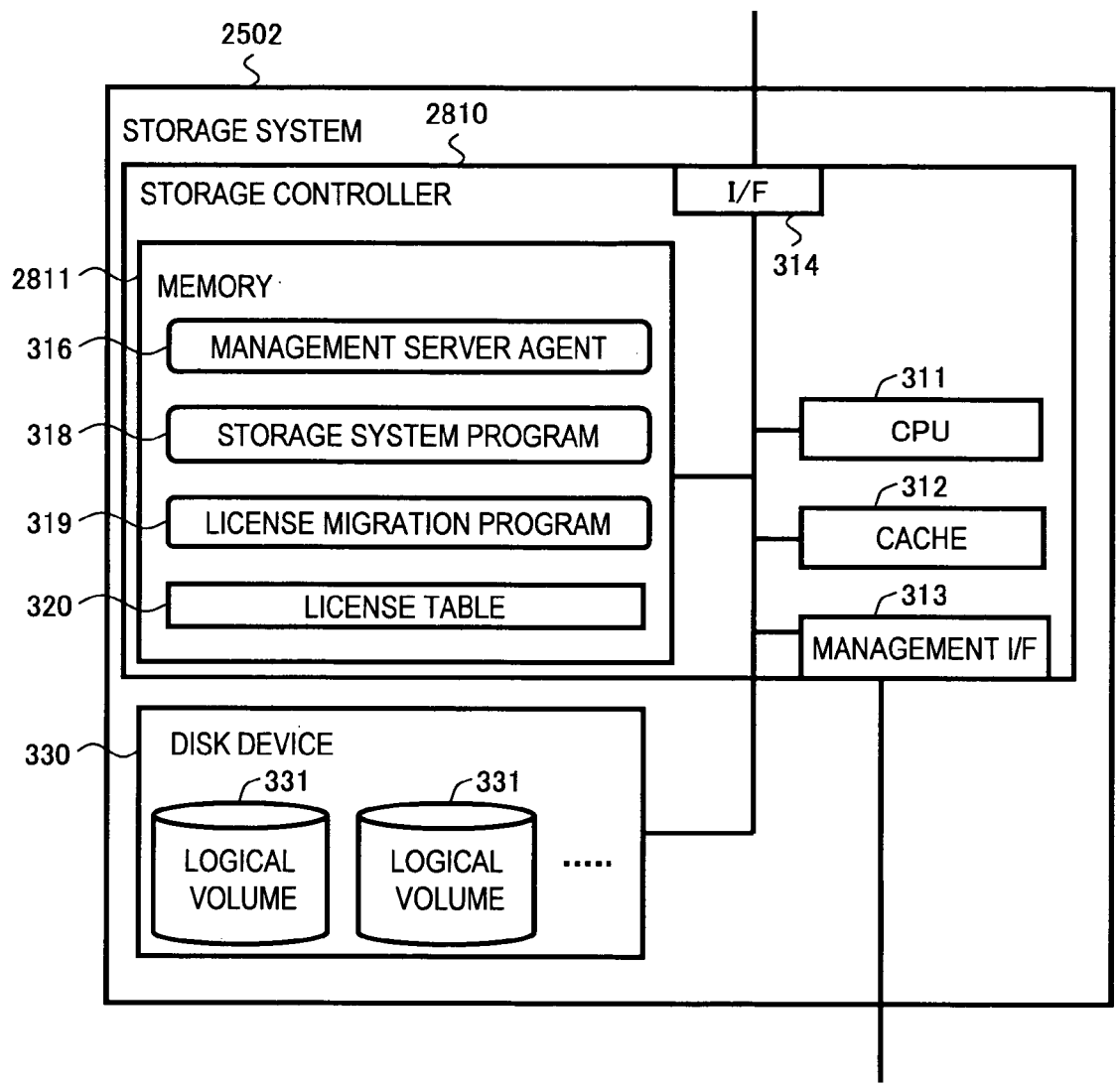
FIG. 28 is a block diagram showing a configuration of an externally connected storage system according to the second embodiment.

FIG. 28 is a block diagram showing a configuration of the externally connected storage system 2502 of the second embodiment.

The storage system 2502 of this embodiment comprises the disk device 330 and a storage controller 2810.

The storage controller 2810 comprises the CPU 311, the cache 312, the management I/F 313, the I/F 314, and a memory 2811.

The I/F 314 communicates with the storage system 2501 via the SAN 110.

The memory 2811 stores at least the management server agent 316, the storage system program 318, the license migration program 319, and the license table 320.

Next, referring to FIGS. 25 to 28, an outline of this embodiment will be described.

According to this embodiment, the storage system 2502 is externally connected to the storage system 2501. Between the application server 120 and the storage system 2501, there is a path set from the I/F 123 via the I/F 111 to the I/F 314 of the storage system 2501. On the other hand, there is no path set between the application server 120 and the storage system 2502. Between the storage systems 2501 and 2502, there is a path set via the I/F 111.

The storage system 2501 comprises a virtualization function of a device base. Accordingly, the storage system 2501 supplies the logical volume 331 of the externally connected storage system 2502 as a virtual volume 2721 to the application server 120.

The application server 120 can directly access the logical volume 331 of the storage system 2501, but not the logical volume 331 of the storage system 2502. However, the application server 120 can indirectly access the logical volume 331 of the storage system 2502 by accessing the virtual volume 2721 of the storage system 2501. In this case, the application server recognizes the virtual volume 2721 as a logical volume 331 actually present in the storage system 2501.

In this case, the virtual volume 2712 is processed as one having a capacity equal to that of the corresponding logical volume 331.

Such external connection is normally realized by adding the storage system 2501 to the connection of the application server 120 with the storage system 2502 via the SAN 110. Before the addition of the storage system 2501, the application server 120 directly accesses the logical volume 331 of the storage system 2502. After the addition of the storage system 2501, the application server 120 accesses the virtual volume 2721 of the storage system 2501 to indirectly access the logical volume 331 of the storage system 2502.

In such a case, when the storage system 2501 is added, and the virtual volume 2721 is set, it may be necessary to migrate a license of the storage system program 318 used by the storage system 2502 to the storage system 2501.

This embodiment relates to a license migration when such external connection is executed.

FIG. 29 is an explanatory diagram of the external volume mapping table 2713 of the second embodiment.

In the external volume mapping table 2713, information indicating correspondence between a logical volume 331 to be externally connected and a virtual volume 2721 is registered.

For the external volume mapping table 2713, in a storage system 2910 to be externally connected, a storage system name 2911 and a logical volume ID 2912 of an external connected storage system 2502 are registered. On the other hand, in a storage system 2920 that comprises an external connection function, a storage system name 2921 and a virtual volume ID 2922 of the storage system 2501 which comprises an external connection function (i.e., virtualization function) are registered. The virtual volume ID 2922 is an identifier of a virtual volume 2721 obtained by virtualizing a logical volume indicated by the logical volume ID 2912. Hereinafter, the logical volume 331 virtualized by the virtual volume 2721 will be referred to as an external logical volume 331. The external logical volume 331 and the storage system 2502 including the same will be referred to as "transfer source", and the virtual volume 2721 and the storage system 2501 including the same will be referred to as "transfer destination".

An example of FIG. 29 shows a case of the external connection shown in FIG. 25. The storage system name 2911 and the logical volume ID 2912 of the externally connected storage system 2910 are respectively "storage system 2502" and "VOL 2". On the other hand, the storage system name 2921 and the virtual volume ID 2922 of the storage system 2910 which comprises the external connection function are respectively "storage system 2501" and "VOL 3". This means that the logical volume "VOL 2" of the storage system 2502 is virtualized as the virtual volume "VOL 3" of the storage system 2501.

Figure 30:
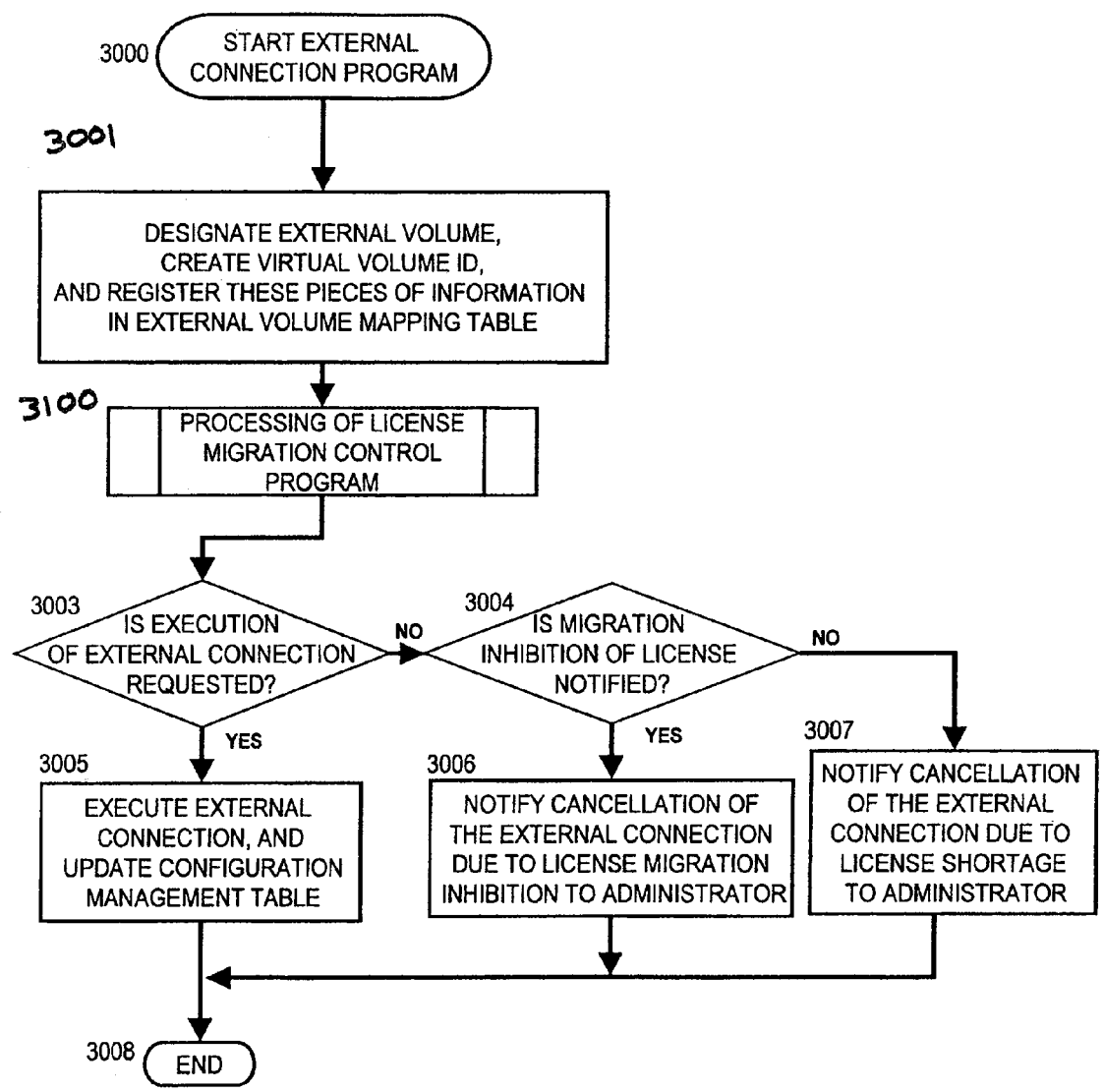
FIG. 30 is a flowchart of processing executed by the externally connected program of the second embodiment.

FIG. 30 is a flowchart of processing executed by the external connection program 2712 of the second embodiment.

When the system administrator executes external connection of the storage system 2501 or the like, the external connection program 2712 is executed. Description below will be of a case where the storage system 2502 is externally connected to the storage system 2501 as shown in FIG. 25.

Upon a start of execution of the external connection program 2712 (3000), the system administrator designates a logical volume ID 2912 of an external logical volume 331 of the storage system 2502 to be externally connected, creates a virtual volume ID 2922 of a virtual volume 2721 corresponding to the external logical volume 331, and registers information thereof in the external volume mapping table 2713 (3001).

Next, the external connection program 2712 causes the management server 2510 to execute the license migration control program 2601 (3100). Processing executed here shown in FIG. 31 will be described in detail later.

Next, the external connection program 2712 determines whether execution of external connection is requested or not as a result of the processing of the license migration control program 2601 (3003).

If it is determined in the step 3003 that the execution of the external connection is requested, external connection according to the external volume mapping table 2713 can be executed. Accordingly, the external connection program 2712 executes external connection according to contents registered in the external volume mapping table 2713 (3005), and the processing comes to an end (3008).

On the other hand, if it is determined in the step 3003 that the execution of the external connection is not requested, the external connection according to the external volume mapping table 2713 cannot be executed. In this case, the external connection program 2712 determines whether inhibition of a license migration has been notified or not as a result of the processing of the license migration control program 2601 (3004).

If it is determined in the step 3004 that the inhibition of the license migration has been notified, a license cannot be migrated while there are enough licenses, and thus the external connection cannot be executed. Accordingly, the external connection program 2712 notifies cancellation of the external connection because of the inhibited license migration to the system administrator (3006), and finishes the processing without executing the external connection (3008).

On the other hand, if it is determined in the step 3004 that the inhibition of the license migration has not been notified, the external connection cannot be executed because of a license shortage. Thus, the external connection program 2712 notifies cancellation of the external connection because of the license shortage to the system administrator (3007), and finishes the processing without executing the external connection (3008).

Figure 31:
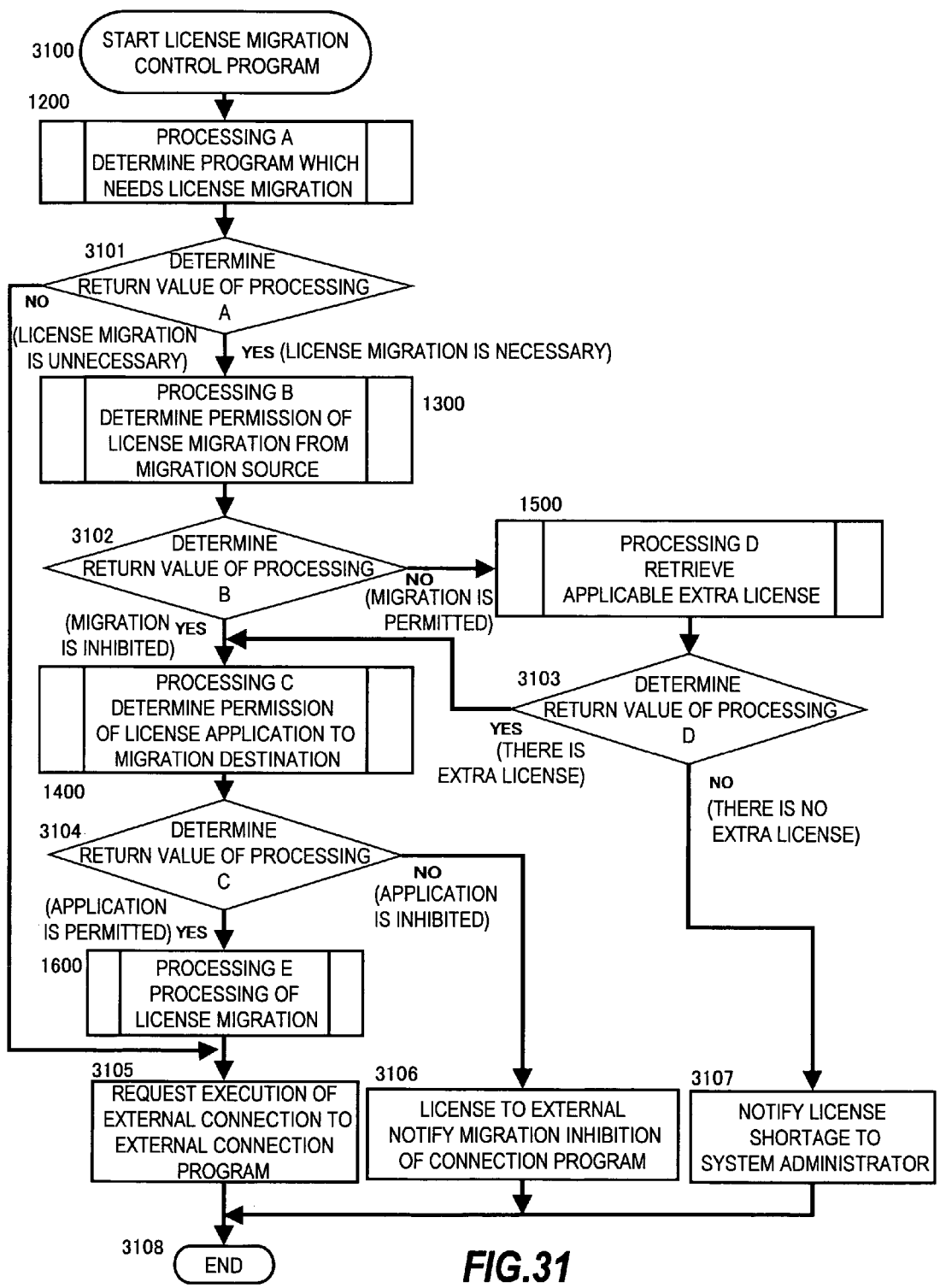
FIG. 31 is a flowchart of processing executed by a license migration control program of the second embodiment.

FIG. 31 is a flowchart of processing executed by the license migration control program 2601 of the second embodiment.

The processing of the license migration control program 2601 is started when the execution is instructed from the external connection program 2712 in the step 3100 of FIG. 30.

Description of portions of the processing of the license migration control program 2601 similar to those of the processing of the license migration control program 205 will be omitted.

Upon a start of the processing (3100), the license migration control program 2601 executes processing A (1200). Contents of the processing A are as described above with reference to FIG. 12. However, in the processing A of FIG. 12, "license migration control program 205", "migration management table 208", "migration", "migration source", and "migration destination" respectively correspond to "license migration control program 2601", "external volume mapping table 2713", "external connection", "transfer source", and "transfer destination". This will be similar for processing B, processing C, processing D, and processing E described below. By the processing A, a storage system program 318 which needs to migrate a license to a virtual volume 2721 of the transfer destination is determined.

Next, the license migration control program 2601 determines a return value of the processing A (3101).

If it is determined in the step 3101 that the return value of the processing A is "NO", external connection can be executed without migrating a license of any storage system program 318. Thus, the license migration program 2601 proceeds to a step 3105 (described later).

On the other hand, if it is determined in the step 3101 that the return value of the processing A is "YES", it is necessary to migrate a license of at least one of the storage system programs 318. In this case, the license migration control program 2601 executes processing B (1300).

The processing B determines whether a necessary license can be migrated or not from the logical volume 331 of the transfer source to the virtual volume 2721 of the transfer destination shown in FIG. 13.

Next, the license migration control program 2601 determines a return value of the processing B (3102).

If the return value of the processing B is determined to be "YES" in the step 3102, a necessary license can be migrated to the virtual volume 2721 of the transfer destination. In this case, the license migration control program 2601 proceeds to a step 1400 to execute processing C (described later).

On the other hand, if the return value of the processing B is determined to be "NO" in the step 3102, the necessary license cannot be migrated to the virtual volume 3721 of the transfer destination. In this case, the license migration control program 2601 executes processing D (1500).

The processing D determines whether there is an extra license or not to be applied to the virtual volume 2721 of the transfer destination shown in FIG. 15.

Next, the license migration control program 2601 determines a return value of the processing D (3103).

If the return value of the processing D is determined to be "NO" in the step 3103, there is no extra license to be applied to the virtual volume 2721 of the transfer destination. In this case, there is a shortage of licenses to be applied to the transfer destination. Thus, the license migration control program 2601 notifies the license shortage to the system administrator (3107) to finish the processing (3108).

On the other hand, if the return value of the processing D is determined to be "YES" in the step 3103, there is an extra license to be applied to the virtual volume 2721 of the transfer destination. In this case, the license migration control program 2601 executes the processing C (1400).

The processing C determines whether a license can be applied or not to the virtual volume 2721 of the storage system 2501 of the transfer destination shown in FIG. 14.

Next, the license migration control program 2601 determines a return value of the processing C, after executing the processing C (3104).

If it is determined in the step 3104 that the return value of the processing C is "NO", a necessary license cannot be applied to the virtual volume 2721 of the transfer destination. In this case, the license migration control program 2601 notifies inhibition of a license migration to the external connection program 2712 (3106), and finishes the processing (3108).

On the other hand, if the return value of the processing C is determined to be "YES" in the step 3104, a necessary license can be applied to the virtual volume 2721 of the transfer destination. In this case, the license migration control program 2601 executes processing E (1600).

The processing E is for migrating a license shown in FIG. 16.

Next, the license migration control program 2601 requests execution of external connection to the external connection program 2712 (3105), and finishes the processing (3108).

According to the embodiments as described above, before execution of external connection, determination is made as to whether or not it is necessary to apply the license of the storage system program to the storage system of the transfer destination. Then, when the license must be applied, determination is made as to whether a necessary license can be migrated or not.

If the license can be migrated and the license migration provides enough licenses, use of the storage system program can be continued without purchasing a new license.

Only if the license cannot be migrated, or only if there is still a shortage of licenses even when the license is migrated, a new license needs to be purchased. Thus, running costs of the storage system are reduced.

What is claimed is:

1. A computer system, comprising:
a plurality of storage systems interconnected via a network, each storage system including at least one logical volume that stores data; and
a management computer that is connected to the plurality of storage systems via the network,
wherein the management computer comprises a memory, a port connected to the network, and a processor connected to the port,
wherein the memory stores a used license table that registers license information regarding each license held by each of the plurality of storage systems for each storage system program installed on each of the plurality of storage systems,
wherein the used license table includes a maximum capacity which is a maximum value of a capacity of the at least one logical volume to which each license is permitted to be applied, and includes a used capacity which is a capacity of the at least one logical volume to which each license is actually applied,
wherein the plurality of storages systems comprises a first storage system and a second storage system,
wherein the processor is programmed to designate a first logical volume of the first storage system as a transfer source of the data, and a second logical volume of the second storage system as a transfer destination of the data,
wherein the processor is programmed to determine whether it is necessary to migrate a license of a storage system program used for the first logical volume of the transfer source to the second storage system of the transfer destination,
wherein when it is determined necessary to migrate the license, the processor is programmed to migrate the license information regarding the license to the second storage system of the transfer destination, and instructs, via the port, the first storage system to transfer the data to the second storage system,
wherein the processor is programmed to determine whether or not a storage system program used for the first logical volume of the transfer source is the same as the storage system program used for the second storage system of the transfer destination,
wherein when it is determined that the storage system program used for the first logical volume of the transfer source is not the same as the storage system program used in the second storage system of the transfer destination, the processor is programmed to determine that it is necessary to migrate the license by an amount equal to a capacity of a logical volume of the transfer destination,
wherein when it is determined that the storage system program used for the first logical volume of the transfer source is the same as the storage system program used in the second storage system of the transfer destination, the processor is programmed to refer to the used license table to calculate an unused capacity of the license of the storage system program used for the first logical volume, and to determine whether the unused capacity of the license is less than the capacity of the second logical volume of the transfer destination,
wherein the unused capacity is a value obtained by subtracting the used capacity from the maximum capacity,
wherein when it is determined that the unused capacity of the license is less than the capacity of the logical volume of the transfer destination, the processor is programmed to determine whether it is possible to divide the license or not,
wherein when it is determined that it is possible to divide the license, the processor is programmed to determine that it is necessary to migrate the license by an amount equal to a capacity obtained by subtracting the unused capacity from the capacity of the logical volume of the transfer destination, and
wherein when it is determined that it is impossible to divide the license, the processor is programmed to determine that it is necessary to migrate the license by an amount equal to the capacity of the logical volume of the transfer destination.

2. The computer system according to claim 1,
wherein when it is determined necessary to migrate the license, the processor is programmed to determine whether or not the storage system program is used for a logical volume which is in the storage system of the transfer source,
wherein the logical volume which is in the storage system is not the transfer source,
wherein when it is determined that the storage system program is not used for the logical volume which is in the storage system of the transfer source and is not the transfer source, the processor is programmed to migrate the license information from the storage system of the transfer source to the storage system of the transfer destination,
wherein when it is determined that the storage system program is used for the logical volume which is in the storage system of the transfer source and is not the transfer source, the processor is programmed to determine whether it is possible to divide the license, and
wherein when it is determined possible to divide the license, the processor is programmed to migrate the license information from the storage system of the transfer source to the storage system of the transfer destination.

3. The computer system according to claim 1,
wherein when it is determined necessary to migrate the license, the processor is programmed to refer to information regarding a model of the storage system of the transfer destination to determine whether it is possible to apply the license to the model of the storage system, and
wherein when it is determined possible to apply the license to the model of the storage system of the transfer destination, the processor is programmed to migrate the license information to the storage system of the transfer destination.

4. The computer system according to claim 1,
wherein when it is determined necessary to migrate the license, and when the unused capacity of the license of the storage system program held by one of the plurality of storage systems is not less than a capacity determined necessary to be migrated to the logical volume of the transfer destination, the processor is programmed to determine whether the license is used or not for any one of the logical volumes, wherein when it is determined that the license is not used for any logical volume, the processor is programmed to determine that the license is an extra license, wherein when it is determined that the license is used for at least one logical volume, the processor is programmed to determine whether it is possible to divide the license or not, wherein when it is determined that it is possible to divide the license, the processor is programmed to determine that the unused capacity of the license is the extra license, wherein when it is determined that it is impossible to divide the license, the processor is programmed to determine that there is no extra license, and wherein when it is determined that there is an extra license, the processor is programmed to migrate license information regarding the extra license to the storage system of the transfer destination.

* * * * *